United States Patent
Shuai et al.

(10) Patent No.: US 8,477,725 B2
(45) Date of Patent: Jul. 2, 2013

(54) METHOD, DEVICE AND SYSTEM FOR IMPLEMENTING OPTIMIZED INTER-RAT HANDOVER

(75) Inventors: Yanglai Shuai, Shenzhen (CN); Hai Liu, Shenzhen (CN); Wenruo Zhu, Shenzhen (CN); Longgui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 360 days.

(21) Appl. No.: 12/776,671

(22) Filed: May 10, 2010

(65) Prior Publication Data

US 2010/0232393 A1    Sep. 16, 2010

Related U.S. Application Data

(63) Continuation of application No. PCT/CN2008/072987, filed on Nov. 7, 2008.

(30) Foreign Application Priority Data

Nov. 9, 2007    (CN) .......................... 2007 1 0169584

(51) Int. Cl.
*H04W 36/00* (2009.01)
*H04W 4/00* (2009.01)

(52) U.S. Cl.
USPC .......... 370/331; 370/235; 370/311; 370/313; 370/332; 455/436

(58) Field of Classification Search
USPC ................................. 370/328–463
See application file for complete search history.

(56) References Cited

U.S. PATENT DOCUMENTS

| | | | | |
|---|---|---|---|---|
| 7,318,187 B2 * | 1/2008 | Vayanos et al. | ............... | 714/776 |
| 7,864,699 B2 * | 1/2011 | Hu et al. | ........................ | 370/252 |
| 7,953,042 B2 * | 5/2011 | Kwak et al. | .................... | 370/331 |
| 8,059,679 B2 * | 11/2011 | Hu et al. | ........................ | 370/466 |
| 8,095,134 B2 * | 1/2012 | Huang et al. | .................. | 455/436 |

(Continued)

FOREIGN PATENT DOCUMENTS

| CN | 1813484 A | 8/2006 |
|---|---|---|
| CN | 101001442 A | 7/2007 |

(Continued)

OTHER PUBLICATIONS

Written opinion of corresponding PCT Patent Application No. PCT/CN2008/072987, mailed on Feb. 12, 2009, 4 pages total.

(Continued)

*Primary Examiner* — Ayaz Sheikh
*Assistant Examiner* — Venkatesh Haliyur
(74) *Attorney, Agent, or Firm* — Slater & Matsil, L.L.P.

(57) ABSTRACT

A method, device and system for implementing optimized inter-RAT handover are disclosed. When a user equipment or a source network prepares for a handover to a target network, a corresponding target network ID is obtained from a configured mapping between cell IDs and target IDs according to a received cell ID, target network bearers are established following identification of an access node of the target network, and the user equipment is connected to the target network after handover preparation is complete. With the present invention, when a user equipment is handed-over from a source network to a target network, service continuity can be maintained with an enhanced quality of user experience.

10 Claims, 16 Drawing Sheets

U.S. PATENT DOCUMENTS

| | | | |
|---|---|---|---|
| 8,116,775 B2* | 2/2012 | Choi et al. | |
| 8,359,033 B2* | 1/2013 | Diachina et al. | 455/436 |
| 8,379,599 B2* | 2/2013 | Velev et al. | 370/331 |
| 2005/0147040 A1* | 7/2005 | Vayanos et al. | 370/235 |
| 2005/0169205 A1* | 8/2005 | Grilli et al. | 370/313 |
| 2005/0193309 A1* | 9/2005 | Grilli et al. | 714/752 |
| 2007/0036109 A1* | 2/2007 | Kwak et al. | 370/331 |
| 2007/0207806 A1* | 9/2007 | Shaheen | 455/436 |
| 2007/0249352 A1* | 10/2007 | Song et al. | 455/436 |
| 2007/0287459 A1* | 12/2007 | Diachina et al. | 455/436 |
| 2008/0146231 A1* | 6/2008 | Huang et al. | 455/436 |
| 2008/0184032 A1* | 7/2008 | Li et al. | 713/171 |
| 2008/0188223 A1* | 8/2008 | Vesterinen et al. | 455/436 |
| 2009/0047955 A1* | 2/2009 | Frenger et al. | 455/436 |
| 2009/0047956 A1* | 2/2009 | Moe et al. | 455/436 |
| 2010/0027509 A1* | 2/2010 | Velev et al. | 370/331 |
| 2010/0190500 A1* | 7/2010 | Choi et al. | 455/436 |
| 2010/0202413 A1* | 8/2010 | Vikberg et al. | 370/332 |
| 2010/0232393 A1* | 9/2010 | Shuai et al. | 370/331 |
| 2010/0246530 A1* | 9/2010 | Pehrsson et al. | 370/331 |
| 2010/0246533 A1* | 9/2010 | Lundin et al. | 370/332 |
| 2012/0127956 A1* | 5/2012 | Wang et al. | 370/331 |
| 2012/0182912 A1* | 7/2012 | Watfa et al. | 370/311 |
| 2012/0188980 A1* | 7/2012 | Wang et al. | 370/331 |
| 2013/0016696 A1* | 1/2013 | Adjakple et al. | 370/331 |
| 2013/0051368 A1* | 2/2013 | Liu et al. | 370/331 |
| 2013/0089076 A1* | 4/2013 | Olvera-Hernandez et al. | 370/332 |

FOREIGN PATENT DOCUMENTS

| | | |
|---|---|---|
| CN | 101043727 A | 9/2007 |
| CN | 101043737 A | 9/2007 |
| JP | 2010517411 A | 5/2010 |
| WO | 2005029902 A1 | 3/2005 |
| WO | 2006032003 A2 | 3/2006 |
| WO | 2007103369 A2 | 9/2007 |
| WO | 2007103496 A1 | 9/2007 |
| WO | 2008117968 A1 | 10/2008 |
| WO | 2009002841 A1 | 12/2008 |
| WO | 2008157633 A3 | 3/2009 |
| WO | 2009154640 A3 | 3/2010 |

OTHER PUBLICATIONS

3GPP TS 23.234 V7.5.0: "3rd Generation Partnership Project; Technical Specification Group Services and System Aspects; 3GPP system to Wireless Local Area Network (WLAN) interworking; System description(Release 7)", dated Mar. 2007, 85 pages total.

3GPP TS 23.402 V1.4.0: "3rd Generation Partnership Project-;Technical Specification Group Services and System Aspects;Architecture Enhancements for non-3GPP accesses(Release 8)", dated Oct. 2007, 125 pages total.

3GPP TR 23.882 V1.12.0: "3rd Generation Partnership Project; Technical Specification Group Services and System Aspects; 3GPP System Architecture Evolution: Report on Technical Options and Conclusions(Release 7)", dated Oct. 2007, 218 pages total.

First Office Action of corresponding Chinese Patent Application No. 200710169584.5, mailed on Nov. 27, 2009, and English translation thereof, 10 pages total.

First Office Action of corresponding Japanese Patent Application No. JP2010512499, mailed on Jul. 5, 2011, and English translation thereof, 10 pages total.

Office action issued in corresponding Chinese application No. 201010580462.7, Oct. 19, 2012, and an English translation thereof, total 5 pages.

3GPP TS 23.401 V1.3.0, "3rd Generation Partnership Project; Technical Specification Group Services and System Aspects; GPRS enhancements for E-UTRAN access; (Release 8)," Oct. 2007, total 136 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
                +-+-+-+-+-+-+-+-+-+-+-+-+-+-+-+-+
                |           Sequence #          |
+-+-+-+-+-+-+-+-+-+-+-+-+-+-+-+-+-+-+-+-+-+-+-+-+-+-+-+-+-+-+-+-+
|A|H|L|K|M|R|P|E| Reserved      |           Lifetime            |
+-+-+-+-+-+-+-+-+-+-+-+-+-+-+-+-+-+-+-+-+-+-+-+-+-+-+-+-+-+-+-+-+
|                               |
|                               |
+-+-+-+-+-+-+-+-+-+-+-+-+-+-+-+-+-+-+-+-+-+-+-+-+-+-+-+-+-+-+-+-+
```

FIG. 12

METHOD, DEVICE AND SYSTEM FOR IMPLEMENTING OPTIMIZED INTER-RAT HANDOVER

CROSS-REFERENCE TO RELATED APPLICATIONS

This application claims priority to Chinese Patent Application No. 200710169584.5, filed with the Chinese Patent Office on Nov. 9, 2007 and entitled "Method, Device and System for Implementing Optimized Inter-RAT Handover", which is incorporated herein by reference in its entirety.

FIELD OF THE INVENTION

The present invention relates to inter-radio access technology ("inter-RAT") handover technologies, and in particular, to a method, device and system for implementing optimized inter-RAT handover.

BACKGROUND OF THE INVENTION

Traditional telecommunications networks, especially wireless communications systems such as the Global System for Mobile communications (GSM) and Universal Mobile Telecommunications System (UMTS) have the merits of rich services and strong network control and therefore have been widely adopted. With the continuous development and improvement of network technologies, higher data rates are required. But, because of limited frequency resources and widely variable transport environments, wireless communications systems are unable to provide higher access rates. Therefore, wideband radio access becomes a key solution for higher access rates. Wideband radio access technologies represented by Wireless Local Area Network (WLAN) and World Interoperability for Microwave Access (WiMAX) can provide high rate wideband radio access services. They also support nomadic and mobile applications. The access capability of a wireless communications network is therefore much stronger. The convergence of the mobile communications network and wideband radio access technology becomes an evolutionary trend of telecommunications networks.

In a moving scenario of a wideband radio access network, service continuity is required when a User Equipment (UE) is handed over between different access networks. Because the network prefix varies with the access network link, when a UE is handed over from a source network link to a target access network link, the network prefix of the UE's Internet Protocol (IP) address in the target access network will be different from the network prefix of the IP address in the source network. As a result, in the moving scenario, routing based on a common IP network prefix is unable to forward packets to the target access network position of the UE. If the UE updates its IP address during a handover process, continuity of ongoing services will be impossible.

To solve the above issue, Mobility IP (MIP) is adopted so that a UE is able to keep its Home-of Address (HOA) unchanged when moving. The MIP technology is briefed below.

The basic principle of MIP is that one UE is associated with two IP addresses, namely, Home-of Address (HOA) and Care-of Address (COA), so that the UE is able to maintain its HOA when moving. The UE obtains a HOA from the home network. When the UE moves outside the home network, the UE obtains a COA of the current network from a foreign access link mobile proxy and notifies the home link mobile proxy of the COA. The home link mobile proxy binds the HOA and the COA of the UE and sets up a tunnel between the home link mobile proxy and the COA (foreign access link mobile proxy). Afterwards, the home link mobile proxy sends packets destined for the HOA of the UE to the COA of the UE via the tunnel so as to complete routing of the packets.

Existing telecommunications networks allow a UE to access one or more packet data services of a Packet Data Network (PDN). The multiple packet data services are identified by Access Point Names (APNs). APNs of packet data services the UE wants to access may be pre-configured in the access network or be provided by the UE for the access network. The access network establishes the connectivity from the UE to an appropriate Packet Data Network Gateway (PDN GW) according to an APN. The PDN GW then establishes the connectivity to the appropriate PDN according to the APN.

For efficient management and utilization of network resources, when the UE leaves the network, it is necessary to release resources allocated for the UE in time, including radio channels, bearers, various tunnels and storage, so as to increase the utilization of radio resources.

After network evolution, the UE may obtain required services through one access network of three evolved network structures; after the UE enters the network, if the UE wants to leave the current source network and enter a target network, it is necessary to hand over the UE between the three evolved networks. The bearer in the source network must be handed over to the target network. This includes a target network bearer setup process and a source network bearer release process. To guarantee the continuity of ongoing services when the UE is in handover, with respect to handover between the three evolved networks, the following requirements must be met:

least impact on the handovered networks;
least impact on the UE;
least coupling between handovered networks; and
assured continuity of services.

To meet the above requirements and to offer access choices and service diversity, it is necessary to consider a more optimized handover method between evolved networks so that inter-RAT handover is completed quickly and accurately in real time.

FIG. 1 is a schematic drawing illustrating a structure of optimized handover between three evolved networks in the prior art. In FIG. 1, the interface between a home SGW and a PDN GW is S5 (not shown in the figure) and the interface between different evolved networks is S71, where communications are based on a tunneling protocol. With the S71 interface, the communications between the UE and the target network are transparent to the source network so as to reduce the impact of the handover on the source network and minimize the coupling between the source network and the target network. When implementing the present invention, however, the inventor finds that the prior art has at least the following defect:

In the prior art, specific processes involved in optimized handover are not decomposed. This means there is no complete mechanism or procedure for optimized handover between evolved networks. As a result, continuity of services can not be assured during a handover process.

SUMMARY OF THE INVENTION

Embodiments of the present invention provide a method, device and system for implementing optimized inter-Radio Access Technology ("inter-RAT") handover so as to afford continuity of services in a handover process.

In one aspect of the invention, a method is provided for implementing optimized inter-RAT handover, when a UE or a source network prepares for handover to a target network. The method includes obtaining a corresponding target network ID from a configured mapping relations between cell IDs and target network IDs according to a received cell ID, establishing target network bearers after determining an access node of the target network, and connecting, the UE to the target network after completion of handover preparation.

In another aspect of the invention, a method for implementing optimized inter-RAT handover includes initiating, such as by a UE, a connect establishing process to a target network via a source network when determining to prepare for a handover in the source network, receiving, such as by an MME of the target network, a connect request and establishing a connection to an SGW;

determining, such as by the MME, a connection establishing process of handover is ongoing after completing the connection to the SGW, and initiating a resource reservation process to an access node (AN) of the target network; and connecting the UE to the target network after completion of handover preparation.

Still another method for implementing optimized inter-RAT handover includes:

initiating, such as by a UE, a connection establishing process to a target network via a source network when determining to prepare for a handover in the source network;

initiating, such as by a bearer setup control entity, a bearer setup process to the target network;

receiving, such as by an MME, a bearer setup request from an SGW, sending a resource reservation request, and indicating an AN of the target network not to establish an air interface connection;

receiving, by the AN of the target network, the resource reservation request and reserving resources;

receiving, by the MME, a response message from the AN of the target network and sending a response message to the SGW;

sending, by the bearer setup control entity, a bearer setup complete notification to the MME after completion of bearer setup, indicating the MME that bearers are established; and connecting, the UE to the target network after completion of handover preparation.

Still another method for implementing optimized inter-RAT handover includes:

initiating, by a UE, a connection establishing process to a target network via a source network when determining to prepare for a handover in the source network;

indicating a PDN GW, by an MME or a SGW, not to switch user plane uplink and downlink data paths from the source network to the target network when a connection between the SGW and the PDN GW is setting up; and connecting, the UE to the target network after completion of handover preparation, and indicating the PDN GW, by the MME or the SGW, to switch user plane uplink and downlink data paths from the source network to the target network.

Still another method for implementing optimized inter-RAT handover includes:

initiating, by a UE, a connection establishing process to a target network via a source network when determining to prepare for a handover in the source network;

indicating a PDN GW when a connection between a SGW and the PDN GW is setting up, by an MME or the SGW, to switch a user plane downlink data path from the source network to the target network and maintain a user plane uplink data path in the source network after determining completion of target network bearer setup; and connecting the UE to the target network after completion of handover preparation, and indicating the PDN GW, by the MME or the SGW, to switch the user plane uplink data path from the source network to the target network.

Still another method for implementing optimized inter-RAT handover includes:

initiating, by a UE, a connection establishing process to a target network via a source network when determining to prepare for a handover in the source network;

initiating, by a PDN GW, a interacting with a Policy and Charging Rules Function (PCRF) after receiving a bearer connection request, and obtaining a Policy and Charging Control (PCC) rule corresponding to the target network;

performing simultaneous, by the PDN GW, two sets of PCC rules corresponding to the source network and the target network and initiating a bearer setup process to the target network; and deleting, by the PDN GW, the PCC rule corresponding to the source network when connecting the UE to the target network after completion of handover preparation.

Another aspect of the invention provides an MME device that includes a receiving unit and a processing unit, in which the receiving unit is adapted to receive a cell ID and send the cell ID to the processing unit, and the processing unit is adapted to receive the cell ID, obtain a corresponding target network ID from a configured mapping between cell IDs and target network IDs, determine an access node of the target network, and send a bearer setup request to the target network.

A system for implementing optimized inter-RAT handover includes a source network, an MME, an SGW, and an evolved UMTS Terrestrial Radio Access Network (E-UTRAN), where:

the source network is adapted to receive a cell ID from a UE and obtain a corresponding target network ID from a configured mapping between cell IDs and target network IDs according to the cell ID and send the target network ID to the MME;

the MME is adapted to receive the target network ID or obtain the corresponding target network ID from the configured mapping between cell IDs and target network IDs according to a received cell ID, determine a corresponding E-UTRAN, and set up bearers with the SGW;

the SGW is adapted to set up bearers with the MME; and the E-UTRAN is adapted to set up bearers with the MME.

Another system for implementing optimized inter-RAT handover includes a source network, an MME, an SGW, and an E-UTRAN, where:

the source network is adapted to receive a connect request from a UE and send the request to the MME;

the MME is adapted to receive the connect request from the source network, set up a connection with the SGW, and after completion of the connection with the SGW, determine that a connection setup process of network handover is ongoing and initiate a resource reservation process to the E-UTRAN;

the SGW is adapted to set up bearers with the MME; and the E-UTRAN is adapted to receive a resource reservation request from the MME, reserve resources and set up bearers.

Still another system for implementing optimized inter-RAT handover includes a source network, an MME, an SGW, a PDN GW, and an E-UTRAN, where:
the source network is adapted to receive a connect request from a UE and send the request to the MME;
the MME is adapted to receive the connect request from the source network, set up bearers to the SGW, receive a bearer setup request from the SGW, send a resource reservation request to the E-UTRAN and indicate the E-UTRAN not to establish an air interface connection; receive a response message from the E-UTRAN and send a response message to the SGW; and receive a bearer setup complete notification from the SGW and complete the bearer setup;
the SGW is adapted to establish a connection with the MME and send a proxy binding update message to the PDN GW according to the received response; and receive a bearer setup complete notification from the PDN GW or generated by itself and send the notification to the MME;
the PDN GW is adapted to receive the proxy binding update message from the SGW and establish user plane paths with the SGW; and send a bearer setup complete notification to the SGW; and
the E-UTRAN is adapted to receive the resource reservation message, reserve resources and set up bearers.

Still another system for implementing optimized inter-RAT handover includes a source network, an MME, an SGW, and a PDN GW, where:
the source network is adapted to receive a connect request from a UE and send the request to the MME;
the MME is adapted to receive the connect request from the source network, set up bearers to the SGW, and when a connection is established or updated between the SGW and the PDN GW, indicate the PDN GW not to switch user plane uplink and downlink data paths from the source network to the target network; and, after the UE is connected to the target network, indicate the PDN GW to switch the user plane uplink and downlink data paths from the source network to the target network;
the SGW is adapted to establish a connection with the MME, establish or update the connection with the PDN GW, and send the received or self-generated user plane uplink and downlink data path processing indication to the PDN GW; and, after the UE is connected to the target network, indicate the PDN GW to switch the user plane uplink and downlink data paths from the source network to the target network; and
the PDN GW is adapted to establish or update the connection with the SGW, receive the user plane uplink and downlink data path processing indication, and maintain the user plane uplink and downlink data paths in the source network; and after the UE is connected to the target network, switch the user plane uplink and downlink data paths from the source network to the target network.

Still another system for implementing optimized inter-RAT handover includes a source network, an MME, an SGW, and a PDN GW, where:
the source network is adapted to receive a connect request from a UE and send the request to the MME;
the MME is adapted to receive the connect request from the source network, set up bearers to the SGW, and when a connection is established or updated between the SGW and the PDN GW, indicate the PDN GW to switch a user plane downlink data path from the source network to the target network and maintain a user plane uplink data path in the source network; and, after handover preparation is complete and the UE is connected to the target network, indicate the PDN GW to switch the user plane uplink data path from the source network to the target network;
the SGW is adapted to establish a connection with the MME, establish or update the connection with the PDN GW, and send the received or self-generated user plane downlink data path processing indication to the PDN GW; and, after the UE is connected to the target network, indicate the PDN GW to switch a user plane uplink data path from the source network to the target network; and
the PDN GW is adapted to establish or update the connection with the SGW, receive the user plane downlink data path processing indication, switch the user plane downlink data path from the source network to the target network, and maintain the user plane uplink data path in the source network; and, after the UE is connected to the target network, switch the user plane uplink data path from the source network to the target network.

Still another system for implementing optimized inter-RAT handover includes a source access gateway (source AGW), a target access gateway (target AGW), an anchor gateway (anchor GW), and a PCRF, where:
the source AGW is adapted to receive a connect request from a UE and send the request to the target AGW;
the target AGW is adapted to receive the connect request from the source AGW and send a bearer setup request to the anchor GW;
the anchor GW is adapted to receive the bearer setup request, interact with the PCRF to obtain a PCC rule corresponding to the target network, and after handover preparation is complete and the UE is connected to the target network, delete a PCC rule applicable to the source network; and
the PCRF is adapted to interact with the anchor GW to deliver the PCC rule.

Another method for implementing optimized inter-RAT handover includes:
sending, by a UE, a connect request to a target network via a source network when deciding to prepare for a handover in the source network; and
indicating an SGW, by an MME, not to trigger a paging process with respect to the UE upon reception of downlink data when a user plane connection is not established with the target network.

Still another method for implementing optimized inter-RAT handover includes:
receiving, by an MME, a connect request sent by a UE and forwarded by a source network to a target network; and
indicating an SGW, by the MME, not to trigger a paging process with respect to the UE upon reception of downlink data when a user plane connection is not established with the target network.

Another MME device includes:
a receiving unit, adapted to receive a connect request sent by a UE and forwarded by a source network to a target network; and
an indicating unit, adapted to indicate an SGW not to trigger a paging process with respect to the UE upon reception of downlink data when a user plane connection is not established with the target network.

In comparison with the prior art, the embodiments of the invention provide the following advantages. With the method, device and system for implementing optimized inter-RAT handover disclosed by the embodiments of present invention, when a UE or a source network decides to prepare for the handover to a target network, an MME obtains a corresponding target network ID from a configured mapping between cell IDs and target network IDs according to a received cell ID and determines the access node of the target network; meanwhile, the MME sets up a connection to the SGW of the target network and the MME or the SGW indicates the PDN GW not to switch user plane uplink and downlink data paths from the source network to the target network or to switch only the user plane downlink data path from the source network to the target network; when the connection with the SGW is complete, the MME sends a resource reservation request to the access node of the target network and indicates the target network not to establish an air interface connection; after handover preparation is complete and the UE is connected to the target network, the MME or SGW indicates the PDN GW to switch the user plane uplink and downlink data paths or the user plane uplink data path from the source network to the target network. In this way, when the UE is handed over between different access networks in an evolved network, handover performance is improved and continuity of services is assured. Handover becomes seamless with a better user experience.

BRIEF DESCRIPTION OF THE DRAWINGS

FIG. 12 is a schematic drawing showing setting of the indication information in an embodiment of the invention;

DETAILED DESCRIPTION OF THE INVENTION

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain without creative work based on embodiments of the present invention also fall in the scope of protection of the present invention.

Figure 1:
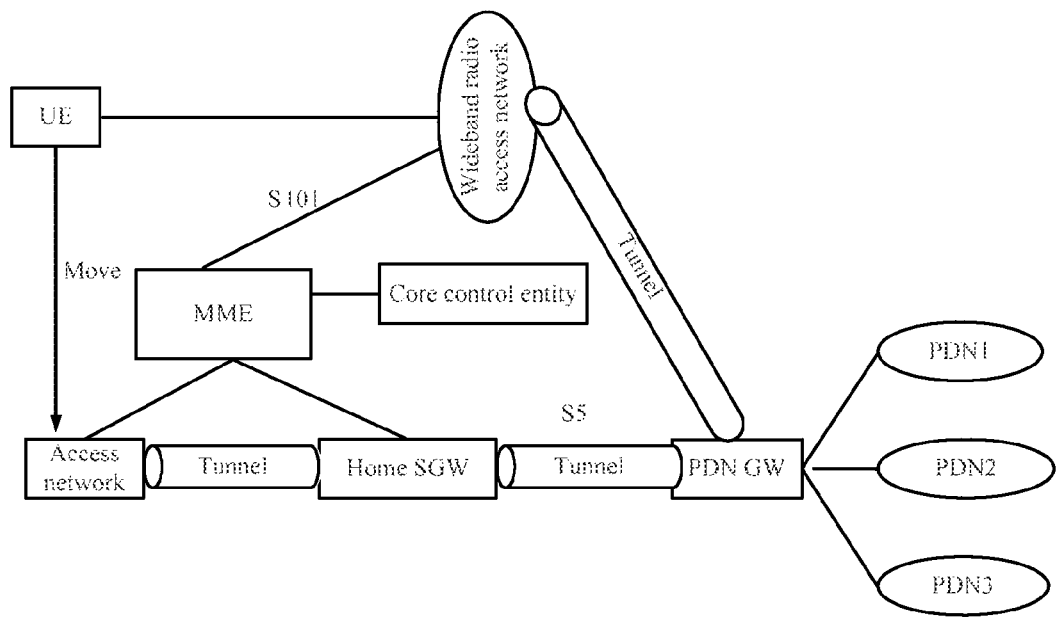
FIG. 1 is a schematic drawing illustrating a structure of optimized handover between three evolved networks in a prior art.
Figure 2:
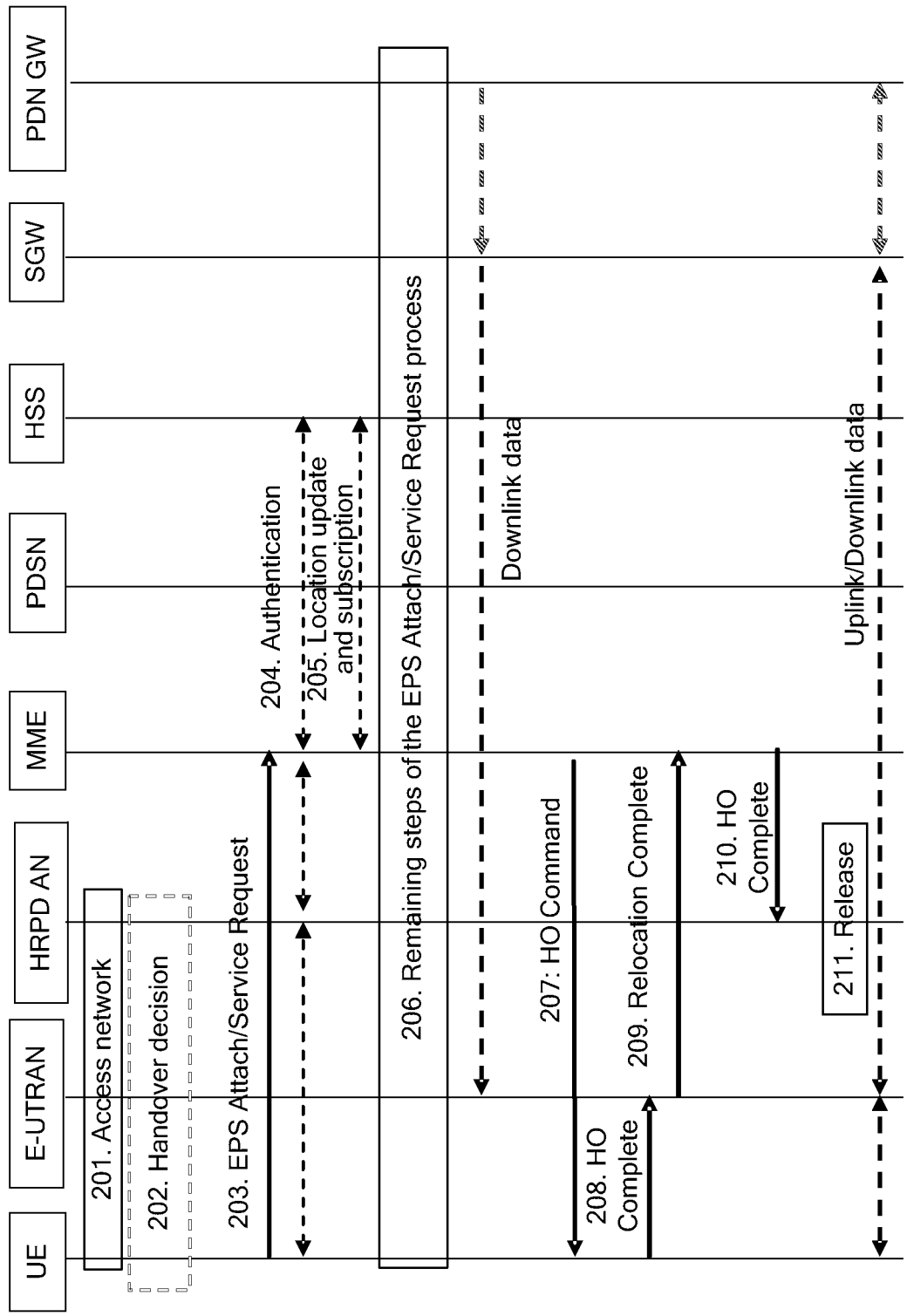
FIG. 2 is a flowchart of optimized handover from an HRPD network to an LTE network as described in SGPP TS23.402.

FIG. 2 is a flowchart of optimized handover from a High Rate Packet Data (HRPD) network to a Long Term Evolution (LTE) network. As shown in FIG. 2, the handover process includes:

Step 201: A UE accesses an HRPD Access Node (HRPD AN) to make a session with the HRPD network.

Step 202: The UE or the HRPD AN makes a Handover (HO) decision.

Step 203: The UE sends an Evolved Packet System Attach/Service Request via the HRPD AN to an MME, requesting to be attached to the target network.

Step 204: If the MME does not obtain a Mobility Management Context (MM Context) corresponding to the UE, the MME requests a Home Subscriber System (HSS) to authenticate the UE and establish the corresponding MM Context.

This step is optional.

Step 205: If the MME is attached to an E-UTRAN of an Evolved Packet System (EPS) for the first time, the MME requests location update and obtains subscription data from the HSS.

This step is optional.

Step 206: The remaining steps of the EPS Attach/Service Request process are executed.

After this step, Downlink Data (DL Data) from a PDN GW is sent to the E-UTRAN via an established bearer and buffered in the E-UTRAN.

Step 207: Upon completion of the EPS Attach/Service Request process, the MME sends a Handover to E-UTRAN Command to the UE, notifying the UE to hand the air interface over to the E-UTRAN.

Step 208: The UE receives the message, completes air interface configuration and returns a Handover Complete (HO Complete) message to the E-UTRAN.

Step 209: The E-UTRAN receives the HO Complete message and sends a Relocation Complete message to the MME.

Step 210: The MME sends a HO Complete message to the HRPD AN, notifying the HRPD AN that the UE has been successfully connected to the E-UTRAN.

Step 211: The HRPD AN releases resources using a standard process defined by HRPD.

In the above handover process, the inventor also finds the following defects and weaknesses:

1. At the time of handover preparation, it is necessary to buffer data in an E-UTRAN, but the process does not specify how the MME determines the E-UTRAN;

2. There is no detailed description of the setup of a connection between the MME and the E-UTRAN;

3. It is not specified how and when S101 and S5 connections are established;

4. In the handover process, to guarantee service continuity, the bearer layer handover is transparent to the service layer and therefore it is not allowed to interrupt the transmission of uplink data, because this is the only way to assure transparency of handover to the service layer; in the above process, however, at the time of early path switch (which means, before the UE is handed over to the target network, the PDN GW is switched to bind the target network) for handover preparation, both uplink and downlink data will be switched to the target network so that uplink data transmission is interrupted and as a result services are interrupted at the service layer; lossless data transmission cannot be assured in the uplink;

5. With early path switch, the handover process does not describe how to set up a default bearer or a dedicated bearer; and 6. In the case of applying Policy and Charging Control (PCC), the process does not consider how PCC rules are applied by a network anchor during the handover process to implement control (such as charging control) of the source network and the target network.

In view of the above, in embodiments of the invention, when a UE is handed over from a source network to a target network, the MME chooses the target network according to its configuration or information carried in a received message and establishes a connection with the target network; the SGW sets up a connection with the PDN GW and indicates the PDN GW not to switch uplink data and to buffer received downlink data; during the handover process, when the UE is still in the source network, the uplink transport path by way of the source network is not torn down and PCC control is implemented in the handover process.

In the embodiments of the invention herein, handover is described in situations where the UE is handed over to an E-UTRAN and the access gateway of the source network, such as trusted non-3GPP networks (CDMA 2000 and WiMAX) and nontrusted non-3GPP networks (WLAN and IWLAN), is referred to as Other Access Node (Other AN).

For the above purposes, an embodiment of the invention provides a system for implementing optimized inter-RAT handover.

Figure 3A:
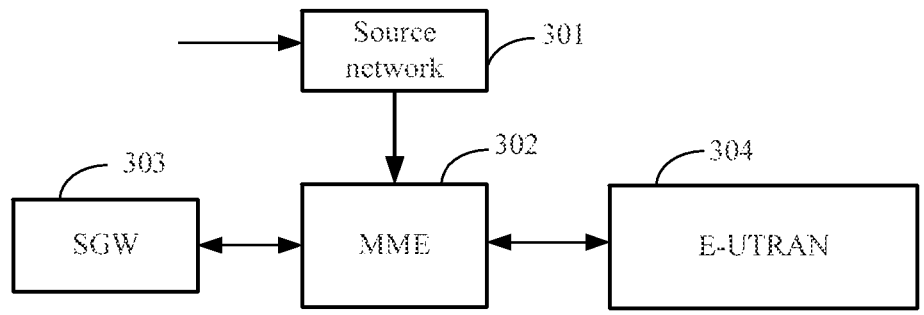
FIG. 3a is a schematic drawing illustrating a first structure of a system for implementing optimized inter-RAT handover in an embodiment of the invention.

FIG. 3a is a schematic drawing illustrating a first structure of the system for implementing optimized inter-RAT handover in the embodiment of the invention. As shown in FIG. 3a, the system includes a source network 301, an MME 302, an SGW 303 and an E-UTRAN 304, where:

the source network 301 is adapted to: receive a cell ID from a UE, send the received cell ID to the MME 302 directly, or obtain a corresponding target network ID from a configured mapping between cell IDs and target network IDs according to the received cell ID, and send the target network ID to the MME 302;

the MME 302 is adapted to: receive the target network ID or obtain a corresponding target network ID from a configured mapping between cell IDs and target network IDs according to a received cell ID, determine a corresponding E-UTRAN 304, and set up bearers with the SGW 303;

the SGW 303 is adapted to set up bearers with the MME 302; and the E-UTRAN 304 is adapted to set up bearers with the MME 302.

In practice, the system for implementing optimized inter-RAT handover shown in FIG. 3a may include:

the source network 301, adapted to: receive a connect request from the UE and forward the request to the MME 302;

the MME 302, adapted to: receive the connect request from the source network 301, set up a connection with the SGW 303, and after completion of the connection with the SGW 303, decide a connection setup process of network handover is ongoing and send a resource reservation request to the E-UTRAN 304;

the SGW 303, adapted to establish a connection with the MME 302; and the E-UTRAN 304, adapted to: receive the resource reservation request from the MME 302, reserve resources and set up bearers.

In practice, the system for implementing optimized inter-RAT handover shown in FIG. 3a may also include:

the source network 301, adapted to: receive a connect request from the UE and forward the request to the MME 302;

the MME 302, adapted to: receive the connect request from the source network 301, set up bearers to the SGW 303 and indicate the SGW 303, and set up bearers to the E-UTRAN 304;

the SGW 303, adapted to: establish a connection with the MME 302 and according to the received indication, if a user plane bearer to the E-UTRAN 304 is not established, buffer received downlink data without paging the UE; and the E-UTRAN 304, adapted to set up bearers with the MME 302.

Figure 3B:
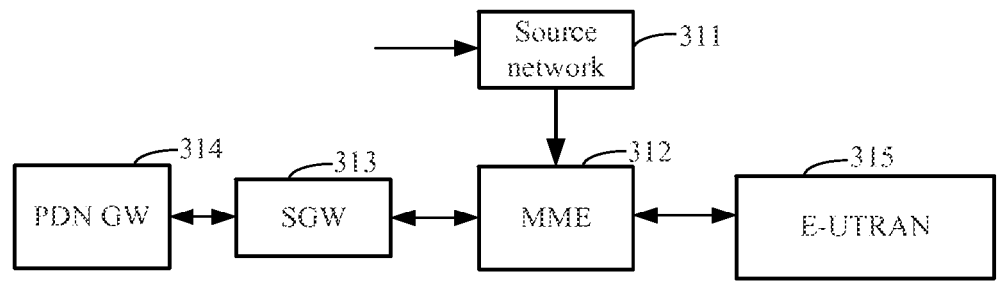
FIG. 3b is a schematic drawing illustrating a second structure of a system for implementing optimized inter-RAT handover in an embodiment of the invention.

FIG. 3b is a schematic drawing illustrating a second structure of the system for implementing optimized inter-RAT handover in the embodiment of the invention. As shown in FIG. 3b, the system includes a source network 311, an MME 312, an SGW 313, a PDN GW 314 and an E-UTRAN 315, where:

the source network 311 is adapted to: receive a connect request from the UE and forward the request to the MME 312;

the MME 312 is adapted to: receive the connect request from the source network 311, set up bearers to the SGW 313, receive a bearer setup request from the SGW 313, send a resource reservation request to the E-UTRAN 315 and indicate the E-UTRAN 315 not to establish an air interface connection; receive a response message from the E-UTRAN 315 and send a response message to the SGW 313; receive a bearer setup complete notification from the SGW 313 and complete bearer setup;

the SGW 313 is adapted to: establish a connection with the MME 312 and send a proxy binding update message to the PDN GW 314 according to the received response; receive a bearer setup complete notification from the PDN GW 314 or generated by itself and send the notification to the MME 312;

the PDN GW 314 is adapted to: receive the proxy binding update message from the SGW 313 and establish user plane paths with the SGW 313; and send the bearer setup complete notification to the SGW 313; and the E-UTRAN 315 is adapted to: receive the resource reservation message, reserve resources and set up bearers.

Figure 3C:
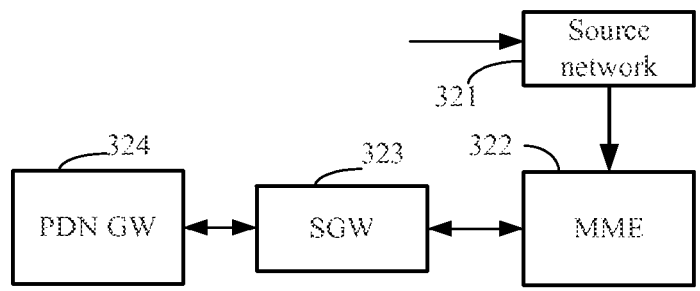
FIG. 3c is a schematic drawing illustrating a third structure of a system for implementing optimized inter-RAT handover in an embodiment of the invention.

FIG. 3c is a schematic drawing illustrating a third structure of the system for implementing optimized inter-RAT handover in the embodiment of the invention. As shown in FIG. 3c, the system includes a source network 321, an MME 322, an SGW 323 and a PDN GW 324, where:

the source network 321 is adapted to: receive a connect request from the UE and forward the request to the MME 322;

the MME 322 is adapted to: receive the connect request from the source network 321, set up bearers to the SGW 323, and when a connection is established or updated between the SGW 323 and the PDN GW 324, indicate the PDN GW 324 not to switch user plane uplink and downlink data paths from the source network 321 to the target network; and, after the UE is connected to the target network, indicate the PDN GW 324 to switch the user plane uplink and downlink data paths from the source network 321 to the target network;

the SGW 323 is adapted to: establish a connection with the MME 322, establish or update the connection with the PDN GW 324, and send the received or self-generated user plane uplink and downlink data path processing indication to the PDN GW 324; and, after the UE is connected to the target network, indicate the PDN GW 324 to switch the user plane uplink and downlink data paths from the source network 321 to the target network; and the PDN GW 324 is adapted to: establish or update the connection with the SGW 323, receive the user plane uplink and downlink data path processing indication, and maintain the user plane uplink and downlink data paths in the source network 321; and, after the UE is connected to the target network, switch the user plane uplink and downlink data paths from the source network 321 to the target network.

In practice, the system for implementing optimized inter-RAT handover shown in FIG. 3c may also include:

the MME 322, adapted to: receive the connect request from the source network 321, set up bearers to the SGW 323, and when a connection is established or updated between the SGW 323 and the PDN GW 324, indicate the PDN GW 324 to switch the user plane downlink data path from the source network 321 to the target network and maintain the user plane uplink data path in the source network 321; and, after handover preparation is complete and the UE is connected to the target network, indicate the PDN GW 324 to switch the user plane uplink data path from the source network 321 to the target network;

the SGW 323, adapted to: establish a connection with the MME 322, establish or update the connection with the PDN GW 324, and send the received or self-generated user plane downlink data path processing indication to the PDN GW 324; and, after the UE is connected to the target network, indicate the PDN GW 324 to switch the user plane uplink data path from the source network 321 to the target network; and the PDN GW 324, adapted to: establish or update the connection with the SGW 323, receive the user plane downlink data path processing indication, and switch the user plane downlink data path from the source network 321 to the target network, and maintain the user plane uplink data path in the source network 321; and, after the UE is connected to the target network, switch the user plane uplink data path from the source network 321 to the target network.

Figure 3D:
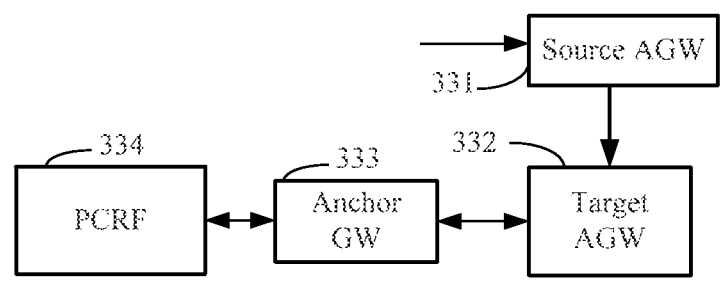
FIG. 3d is a schematic drawing illustrating a fourth structure of a system for implementing optimized inter-RAT handover in an embodiment of the invention.

FIG. 3d is a schematic drawing illustrating a fourth structure of the system for implementing optimized inter-RAT handover in the embodiment of the invention. As shown in FIG. 3d, the system includes a source access gateway 331, a target access gateway 332, an anchor gateway 333, and a PCRF 334, where:

the source access gateway 331 is adapted to: receive a connect request from a UE and forward the request to the target access gateway 332;

the target access gateway 332 is adapted to: receive the connect request from the source gateway 331 and send a bearer setup request to the anchor gateway 333;

the anchor gateway 333 is adapted to: receive the bearer setup request, interact with the PCRF 334 to obtain a PCC rule applicable to the target network, enforce charging rules of two sets of PCC rules, and after the handover preparation is complete and the UE is connected to the target network, delete the PCC rule applicable to the source network 331;

in practice, the anchor gateway 333 may be PDN GW; and the PCRF 334 is adapted to interact with the anchor gateway 333 to deliver a PCC rule.

Figure 3E:
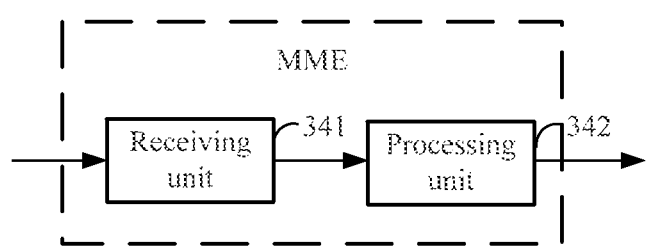
FIG. 3e is a schematic drawing illustrating a structure of an MME in an embodiment of the invention.

FIG. 3e is a schematic drawing illustrating a structure of an MME according to an embodiment of the invention. As shown in FIG. 3e, the MME device includes a receiving unit 341 and a processing unit 342, where:

the receiving unit 341 is adapted to: receive a cell ID and forward the cell ID to the processing unit 342; and the processing unit 342 is adapted to: receive the cell ID, obtain a corresponding target network ID from a configured mapping between cell IDs and target network IDs, determine an access node of the target network, and send a bearer establish request to the target network.

Five embodiments will be described to explain a method for implementing optimized inter-RAT handover provided by the present invention.

First Embodiment

This embodiment describes how an MME chooses an Evolved Base Node (ENB) when a UE is handed over from the other AN to an E-UTRAN.

When a UE is handed over from the other AN to an E-UTRAN, the MME may choose an ENB in two optional solutions.

Solution 1: The other AN configures or obtains information of the mapping between cell IDs and target IDs of the E-UTRAN, and when a handover decision is made, the other AN determines the appropriate target ID according to the cell ID and sends the target ID in a tunnel message to an MME via the S101 interface; the MME receives the target ID and chooses an ENB according to the target ID.

Solution 2: The MME configures or obtains information of the mapping between cell IDs and target IDs; a UE or the other AN sends a cell ID in a tunnel message to the MME via the S101 interface; the MME determines the appropriate target ID according to the received cell ID and chooses the corresponding ENB.

Figure 4:
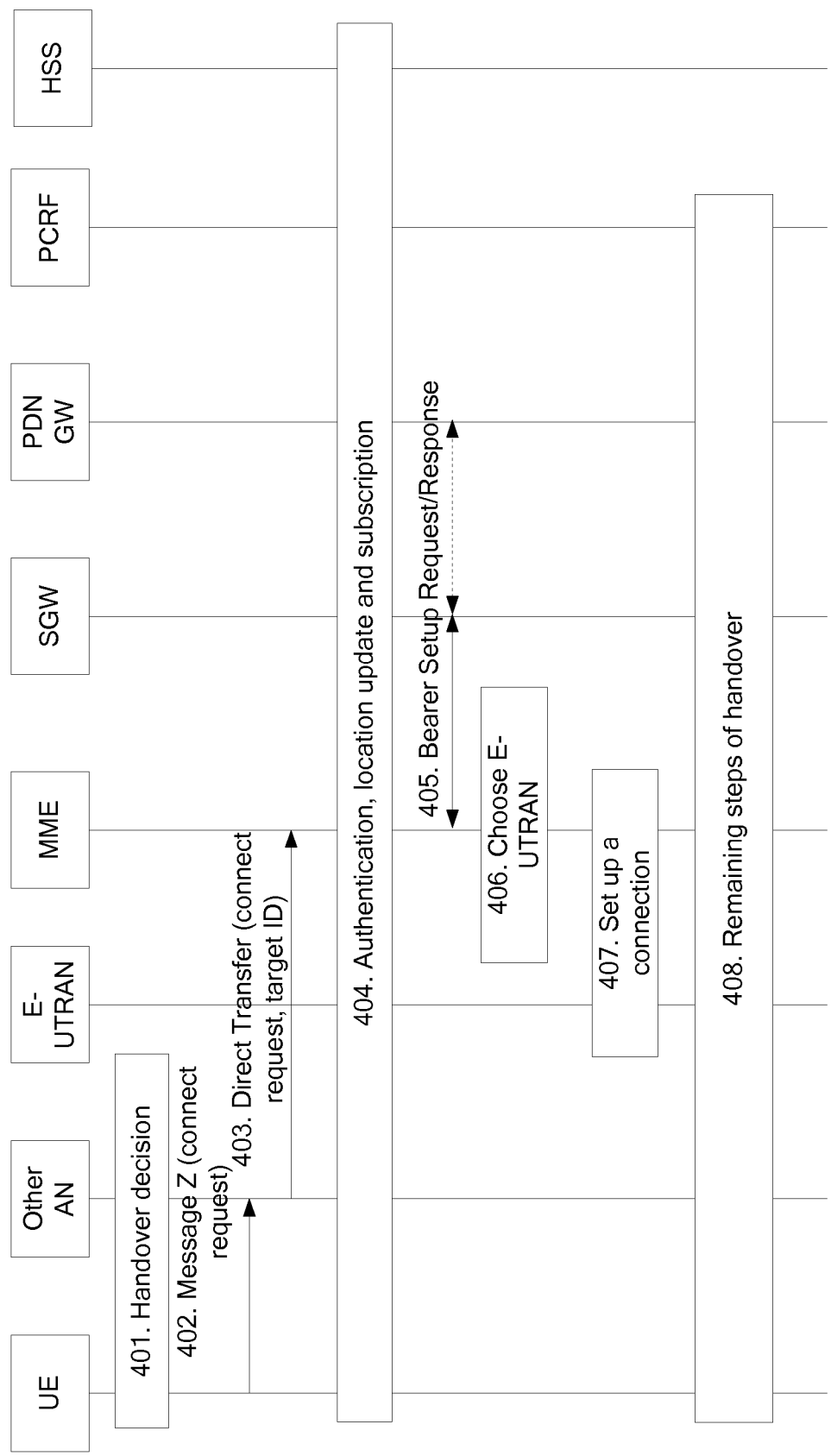
FIG. 4 is a flowchart of a method for implementing optimized inter-RAT handover in a first embodiment of the invention.

FIG. 4 is a flowchart of the method for implementing optimized inter-RAT handover in the first embodiment of the invention. In this embodiment, the mapping between cell IDs and target IDs is configured in an other AN and the other AN sends the target ID to the MME. As shown in FIG. 4, the process includes:

Step 401: The UE or other AN makes a handover decision.

In this step, the other AN may obtain an appropriate target ID from the configured mapping between cell IDs and target IDs according to a selected cell ID.

Step 402: The UE sends a Message Z carrying a connect request to the other AN.

In this step, the Message Z sent from the UE to the other AN is defined in the HRPD network and intended to initiate a connection to the E-UTRAN.

Step 403: The other AN sends a Direct Transfer message to the MME.

In this step, if a target ID is not determined in step 401, the other AN obtains the appropriate target ID from the configured mapping between cell IDs and target IDs according to the selected cell ID. The Direct Transfer message carries the target ID.

Step 404: The MME requests authentication and location update, obtains subscription data, and establishes an appropriate MM Context.

Step 405: The MME chooses an appropriate SGW and sends a bearer setup request to the SGW.

In this step, the SGW may also send a bearer setup request to the PDN GW.

Step 406: The MME chooses the appropriate E-UTRAN according to the target ID carried in the received Direct Transfer message.

In practice, step 406, step 405 and step 404 may be carried out in random order. Step 406 may perform before step 405 or before step 404; step 405 may precede step 404 and after the E-UTRAN is chosen, step 407 can follow.

Step 407: The MME sets up a connection to the chosen E-UTRAN.

Step 408: The remaining steps of the handover process from the other AN to the E-UTRAN are completed.

Figure 5:
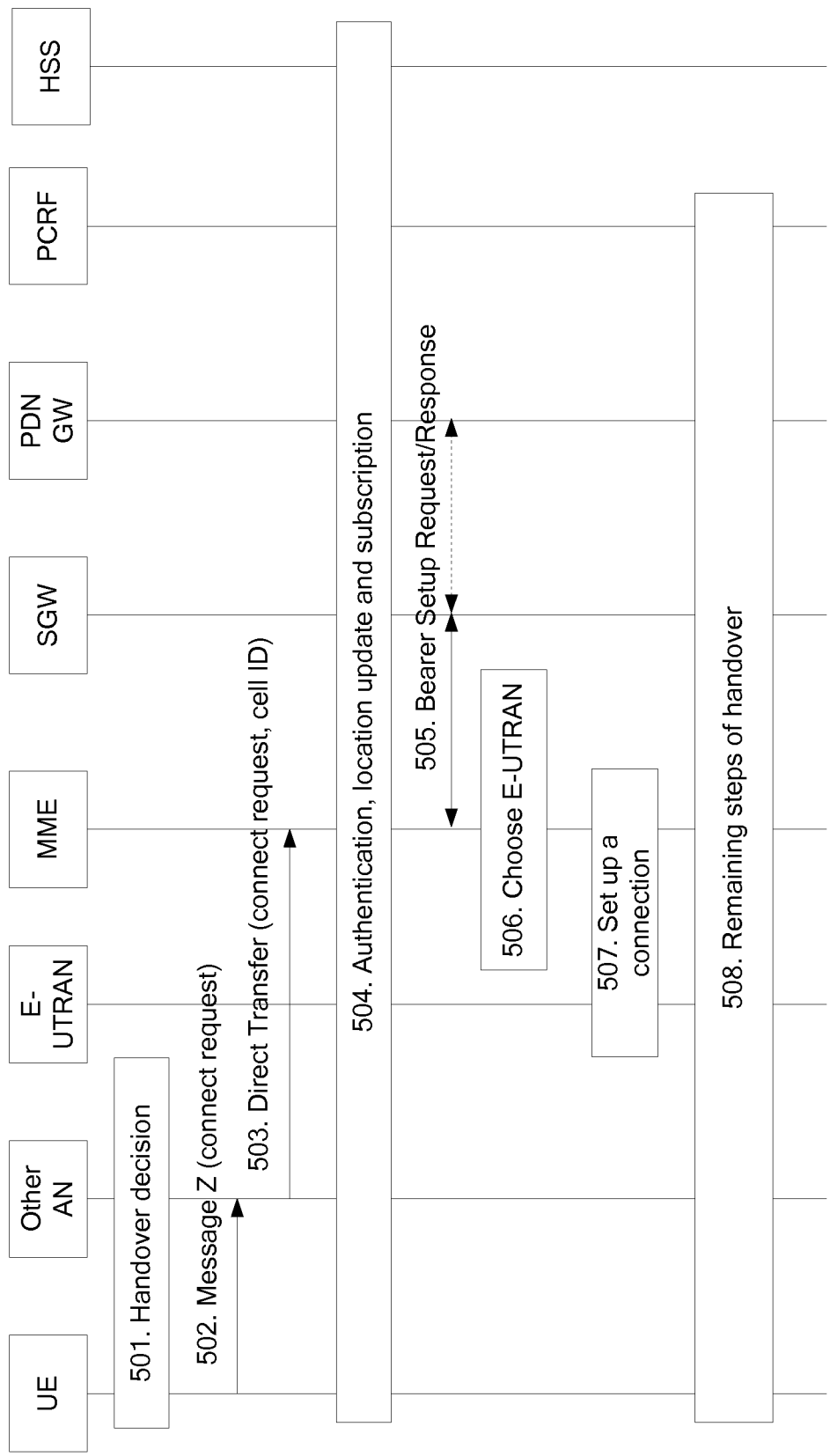
FIG. 5 is another flowchart of the method for implementing optimized inter-RAT handover in the first embodiment of the invention.

FIG. 5 is another flowchart of the method for implementing optimized inter-RAT handover in the first embodiment of the invention. In this embodiment, the mapping between cell IDs and target IDs is configured on the MME and the UE or other AN sends cell ID information to the MME. As shown in FIG. 5, this handover process is different from the process shown in FIG. 4 in the following steps:

Step 503: The other AN sends a Direst Transfer message carrying a chosen cell ID to the MME.

Step 506: The MME obtains the appropriate target ID from the configured mapping between cell IDs and target IDs according to the cell ID carried in the received Direct Transfer message and chooses the appropriate E-UTRAN according to the target ID.

Second Embodiment

This embodiment deals with the specific process of establishing a connection with the E-UTRAN after the MME chooses the appropriate E-UTRAN.

If, after choosing and obtaining SGW information, the MME finds a connection is not established to the chosen ENB with respect to the UE and decides the current process as a connection setup process of handover, the MME initiates a connection to the ENB and completes configuring the user plane uplink bearer and the security mode.

Figure 6:
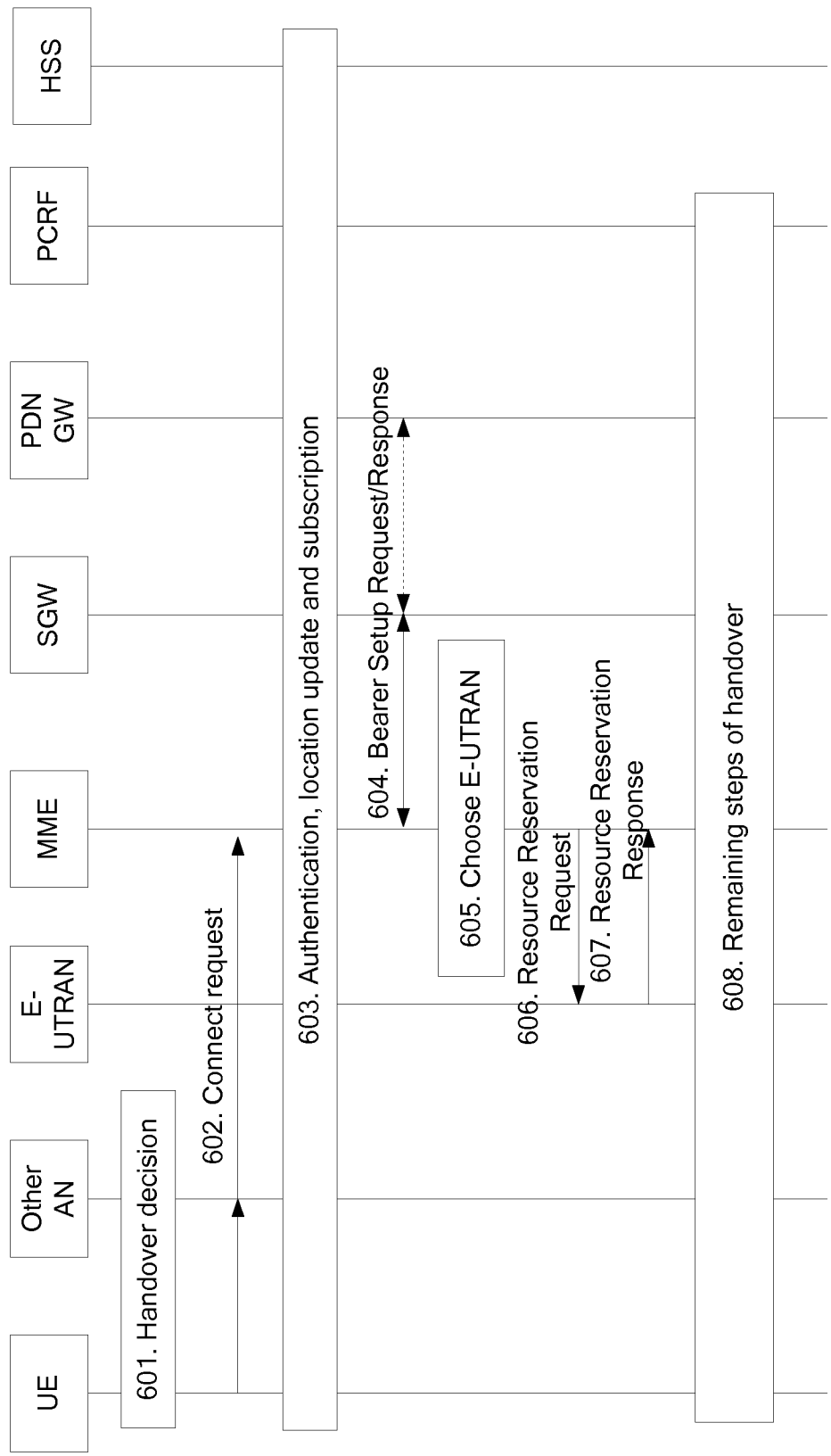
FIG. 6 is a flowchart of a method for implementing optimized inter-RAT handover in a second embodiment of the invention.

FIG. 6 is a flowchart of the method for implementing optimized inter-RAT handover in the second embodiment of the invention. In this embodiment, the MME initiates a connection with the E-UTRAN after it chooses the appropriate E-UTRAN. As shown in FIG. 6, the process includes:

Step 601: The UE or network makes a handover decision.

Step 602: The UE sends a connect request to the MME via the other AN.

In this step, the other AN transparently transmits the connect message.

Step 603: The MME requests authentication and location update, obtains subscription data, and establishes an appropriate MM Context.

Step 604: The MME chooses an appropriate SGW and sends a bearer setup request to the SGW.

In this step, the SGW may also send a bearer setup request to the PDN GW.

Step 605: The MME chooses an appropriate E-UTRAN according to the received target ID.

Step 606: The MME chooses the E-UTRAN and makes judgments.

In this step, after the MME chooses the E-UTRAN, the MME checks whether the following conditions are met:

1. A connection setup process of handover is ongoing;
2. A connection is already established between the SGW and the MME; and
3. The MME does not establish a connection to the chosen E-UTRAN with respect to the UE.

If the three conditions are met, the MME sends a Resource Reservation Request to the E-UTRAN, carrying SGW information, UE capability parameters and security mode parameters.

Step 607: The E-UTRAN returns a Resource Reservation Response.

In this step, the E-UTRAN chooses algorithms for Radio Resource Control (RRC) encryption, integrity protection and user plane encryption and determines RRC related configuration information according to the received Resource Reservation Request; then, the E-UTRAN returns the Resource Reservation Response to the MME. The response message carries information of the chosen E-UTRAN such as the Tunnel Endpoint Identity (TEID) of the E-UTRAN and a handover command which includes RRC configuration information and chosen security parameters.

Step 608: The remaining steps of the handover process from the other AN to the E-UTRAN are completed.

Third Embodiment

In this embodiment, dedicated bearers may be established in two schemes:

Scheme 1: Dedicated bearers are set up one by one; after the default bearer is set up, the bearer setup control entity where the network side Policy and Charging Enforcement Function (PCEF) resides, such as the SGW or PDN GW, initiates a one-by-one dedicated bearer setup process; the MME processes the received bearer setup message and indicates the E-UTRAN not to initiate an air interface bearer setup process by sending a message or adding an indication parameter to the message.

Scheme 2: Dedicated bearer information is transferred in a message; information of a requested bearer is carried in the message and a dedicated bearer is set up after a round trip of the message; and the response message carries information of success or failure in setting up the dedicated bearer.

Figure 7:
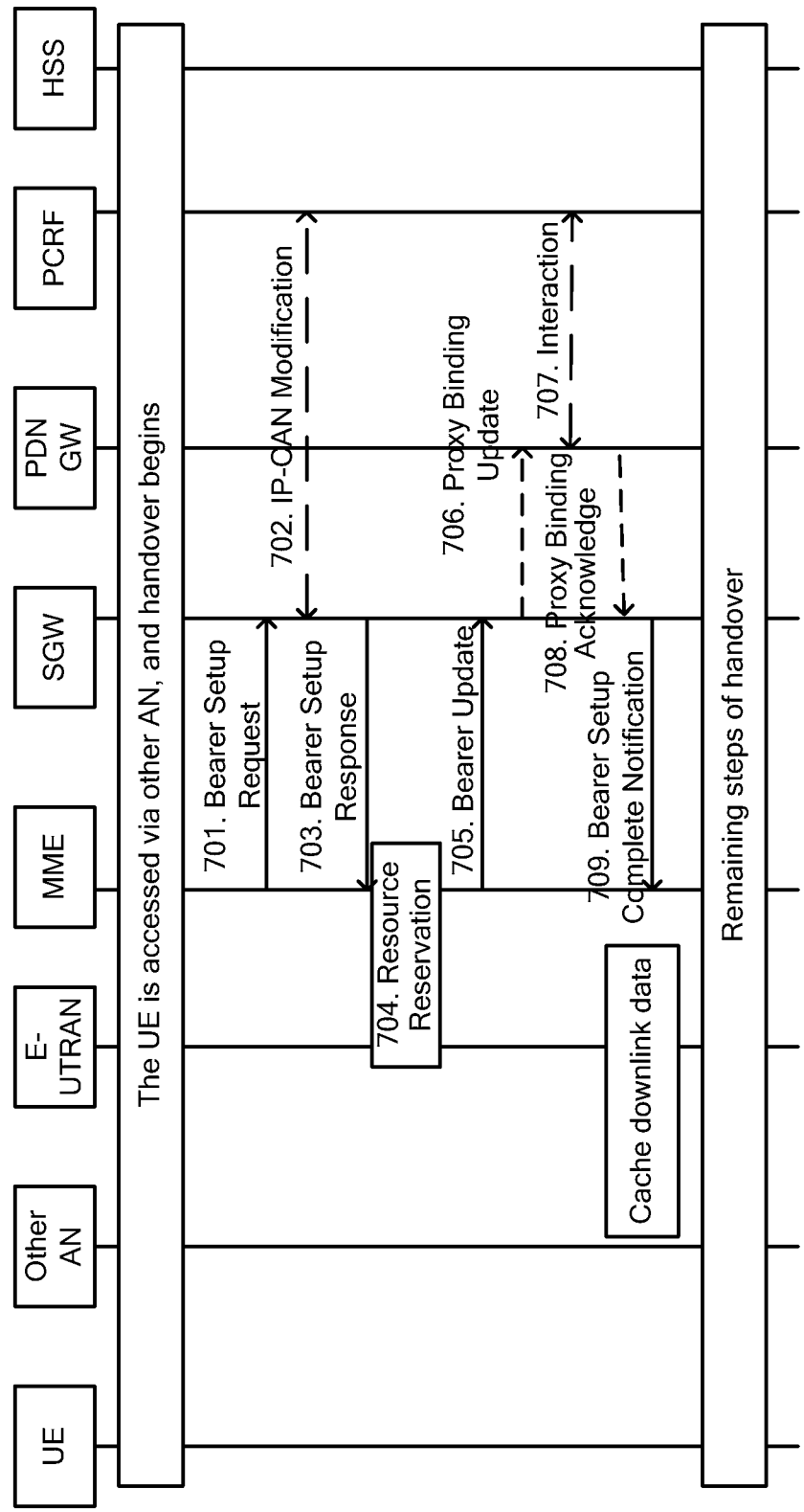
FIG. 7 is a flowchart in a third embodiment of the invention where all bearer information is transferred in one message while the interaction between SGW and PDN GW is based on Proxy Mobile IP (PMIP)

FIG. 7 is a flowchart in the third embodiment of the invention where all bearer information is transferred in one message while the interaction between SGW and PDN GW is based on PMIP. As shown in FIG. 7, the process includes:

Step 701: The MME sends a bearer setup message to the SGW, carrying an indication notifying the SGW that a connection setup process of handover is ongoing.

Step 702: The SGW receives the bearer setup message and initiates an IP-CAN Modification process to the PCRF. During the interaction, the SGW sends the appropriate IP-CAN Type to the PCRF.

This step is optional.

Step 703: The SGW receives a PCC rule returned by the PCRF and determines it is necessary to reserve resources for all bearers; the SGW sends a bearer setup response to the MME, carrying information of all reserved bearers.

In this step, bearer information includes TEID information.

Step 704: The MME sets up bearers with the E-UTRAN.

In this step, the established bearers may include the default bearer and dedicated bearers.

Step 705: The MME sends a bearer update message to the SGW, carrying information of the bearers established by the E-UTRAN, including bearer setup success information and bearer setup failure information.

Step 706: The SGW sends a Proxy Binding Update (PBU) message to the PDN GW to establish a user plane path.

This step is optional. This step is required only when it is necessary to switch the user plane downlink data path to the E-UTRAN in advance. The PBU message or an extended parameter in the PBU message indicates the PDN GW to switch the user plane downlink data path to the E-UTRAN and maintain the user plane uplink data path in the HRPD network. The indication may be sent by the MME or directly by the SGW, or regenerated by the SGW.

Step 707: The PDN GW interacts with the PCRF.

This step is optional. The PDN GW obtains the PCC rule by interacting with the PCRF.

Step 708: The PDN GW returns a Proxy Binding Acknowledge (PBA) to the SGW.

This step is optional. The user plane path from the PDN GW to the SGW and to the E-UTRAN is connected. If the E-UTRAN receives downlink data, the E-UTRAN buffers the downlink data.

Step 709: The SGW sends a bearer setup complete notification to the MME, indicating the MME that the bearer setup is complete via an indication parameter or a special message.

In this step, the indication parameter is an indication parameter carried in the bearer setup complete notification message; the special message is the bearer setup complete notification message.

After the UE is successfully to the target network, the SGW indicates the PDN GW to switch the user plane uplink and downlink data paths to the E-UTRAN via the PBU or extended PBU message. The indication may be sent by the MME or directly by the SGW, or regenerated by the SGW.

Figure 8:
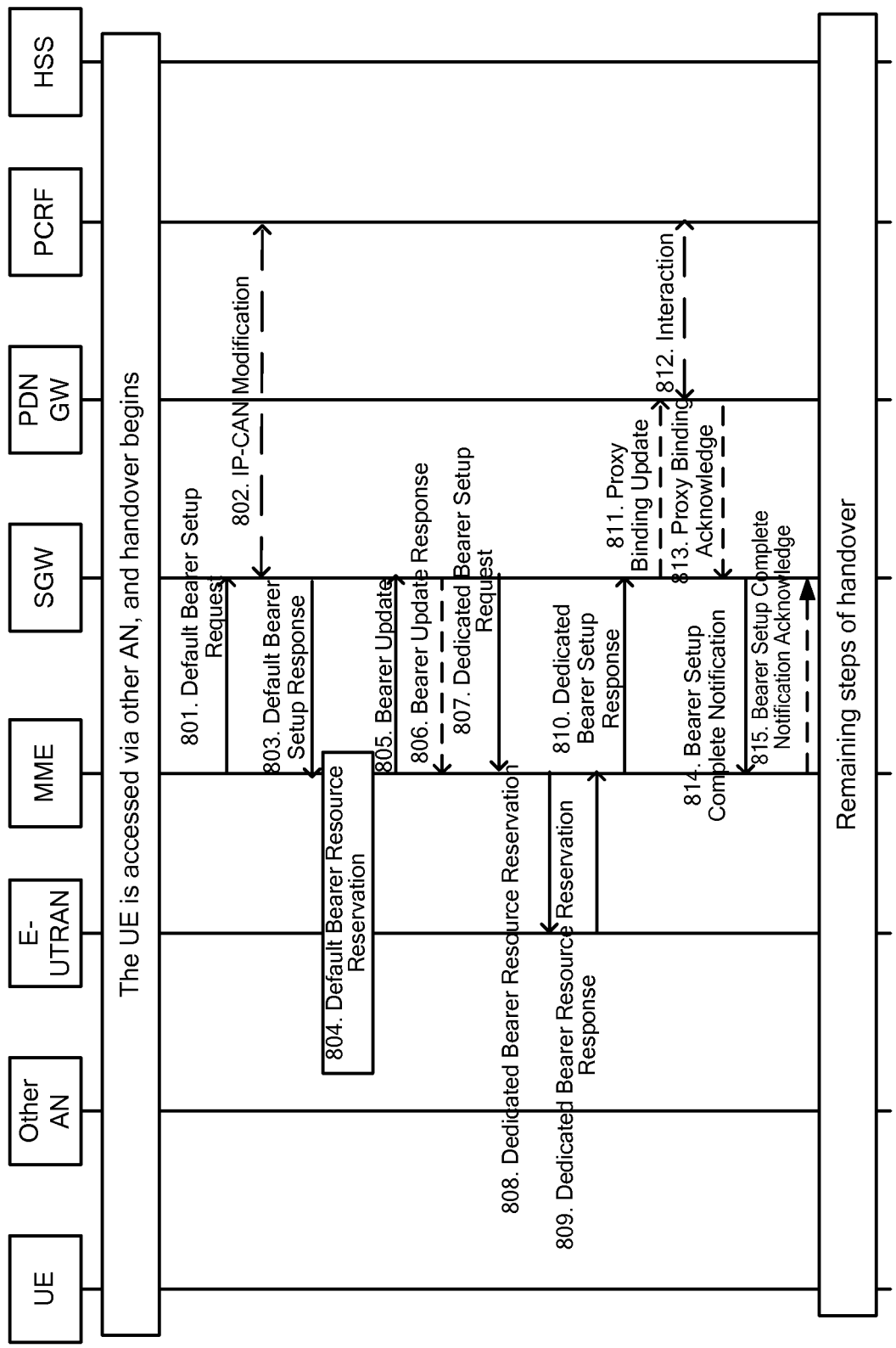
FIG. 8 is a flowchart in the third embodiment of the invention where bearers are set up one by one while the interaction between SGW and PDN GW is based on PMIP.

FIG. 8 is a flowchart in the third embodiment of the invention where bearers are set up one by one while the interaction between SGW and PDN GW is based on PMIP. As shown in FIG. 8, the process includes:

Step 801: The MME sends a bearer setup message to the SGW, carrying an indication notifying the SGW that a connection setup process of handover is ongoing.

Step 802: The SGW receives the bearer setup message and initiates an IP-CAN Modification process to the PCRF. During the interaction, the SGW sends the appropriate IP-CAN Type to the PCRF.

This step is optional.

Step 803: The SGW receives a PCC rule returned by the PCRF and determines it is necessary to reserve resources for all bearers; the SGW sends a bearer setup response to the MME, carrying information of the default bearer.

In this step, default bearer information includes TEID information.

Step 804: The MME sets up the default bearer with the E-UTRAN.

Step 805: The MME sends a bearer update message to the SGW, carrying information of the default bearer established by the E-UTRAN.

STEP 806: The SGW returns a bearer update response message to the MME.

Step 807: The SGW sends a dedicated bearer setup request to the MME, requesting setup of a dedicated bearer.

In this step, the SGW may send multiple dedicated bearer setup requests to the MME in parallel so as to set up multiple dedicated bearers.

Step 808: The MME notifies the E-UTRAN to set up a dedicated bearer, and the notification message carries information indicating the E-UTRAN not to set up an air interface connection; the indication may be a message sent by the MME to the E-UTRAN or an extended indication parameter carried in the message sent by the MME to the E-UTRAN.

Step 809: The E-UTRAN sends a dedicated bearer setup response to the MME.

Step 810: The MME sends a dedicated bearer setup response to the SGW, carrying information of the dedicated bearer established by the E-UTRAN.

Step 811: When it is determined that all dedicated bearers are established, the SGW sends a PBU message to the PDN GW to set up a user plane path.

This step is optional. This step is required only when it is necessary to switch the user plane downlink data path from the HRPD network to the E-UTRAN in advance. The PBU message or an extended parameter in the PBU message indicates the PDN GW to switch the user plane downlink data path to the E-UTRAN and maintain the user plane uplink data path in the HRPD network. The indication may be sent by the MME or directly by the SGW, or regenerated by the SGW.

Step 812: The PDN GW interacts with the PCRF.

This step is optional. The PDN GW obtains the PCC rule by interacting with the PCRF.

Step 813: The PDN GW sends a PBA message to the SGW.

This step is optional. The user plane path from the PDN GW to the SGW and to the E-UTRAN is connected. If the E-UTRAN receives downlink data, the E-UTRAN buffers the downlink data.

Step 814: The SGW sends a bearer setup complete notification to the MME.

In this step, if the SGW determines that the setup of all dedicated bearers is complete, the bearer setup complete notification message may carry a parameter to indicate the MME that bearer setup is complete via a special message or indication parameter; the indication parameter is an indication parameter carried in the bearer setup complete notification and the special message is the bearer setup complete notification. After the MME receives the indication parameter, the MME may initiate subsequent operations related to the completion of setup of all bearers.

Step 815: The MME returns a bearer setup complete notification acknowledge to the SGW.

After the UE is successfully connected to the target network, the SGW indicates the PDN GW to switch the user plane uplink and downlink data paths to the E-UTRAN via the PBU or extended PBU message. The indication may be sent by the MME or directly by the SGW, or regenerated by the SGW.

Figure 9:
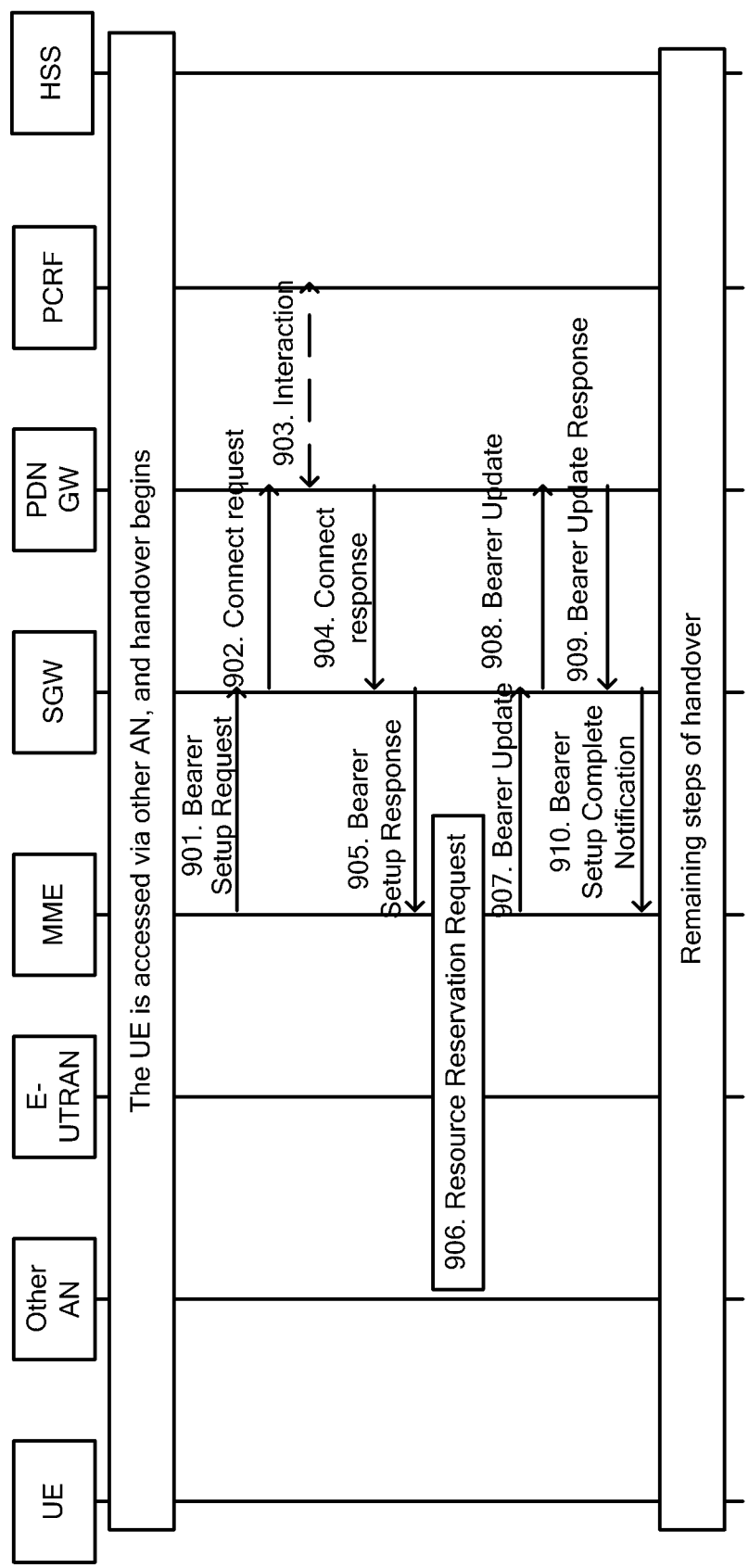
FIG. 9 is a flowchart in the third embodiment of the invention where bearers are set up at a time while the interaction between SGW and PDN GW is based on a GPRS Tunneling Protocol (GTP)

FIG. 9 is a flowchart in the third embodiment of the invention where bearers are set up at a time while the interaction between SGW and PDN GW is based on GTP. As shown in FIG. 9, the process includes:

Step 901: The MME sends a bearer setup message to the SGW, carrying an indication notifying the SGW that a connection setup process of handover is ongoing.

Step 902: Upon reception of the bearer setup message, the SGW sends a connect request to the PDN GW.

In this step, if the SGW obtains QoS information of all requested bearers from the received bearer setup message, the SGW reserves resources for all bearers or else the SGW reserves the default bearer resource; the connect request sent by the SGW to the PDN GW may be a special message or carry a special parameter; the message carries a "path not switch" indication or "downlink path switch" indication. If the indication carried in the message is "path not switch", the PDN GW does not switch user plane uplink and downlink data paths upon reception of the indication but only proceeds to set up bearers; if the indication carried in the message is "downlink path switch", upon reception of the indication, the PDN GW determines that the setup of default and dedicated bearers is not complete in the current E-UTRAN and proceeds to set up bearers.

Step 903: The PDN GW makes an IP-CAN modification interaction with the PCRF. In the process, the PDN GW sends the appropriate IP-CAN Type to the PCRF and receives the PCC rule delivered by the PCRF.

Step 904: The PDN GW determines to reserve resources for all bearers and sends a connect response to the SGW, carrying information of reserved resources.

In this step, information of the reserved resources includes a series of TEIDs.

Step 905: The SGW receives the connect response message and sends a bearer setup response to the MME.

In this step, the SGW receives the connect response message and if it finds that it does not reserve enough resources, the SGW reserves resources again according to the information of resources reserved by the PDN GW carried in the received connect response message and sends a bearer setup response message to the MME, carrying information of all resources reserved by the SGW.

Step 906: The MME notifies the E-UTRAN to reserve resources and indicates the E-UTRAN not to set up an air interface connection via a message or a parameter.

In this step, the message may be a resource reservation message and the indication parameter may be an indication parameter carried in the resource reservation message.

Step 907: The MME sends a bearer update message to the SGW, carrying information of the bearers established by the E-UTRAN, including bearer setup success information and bearer setup failure information.

Step 908: The SGW sends a bearer update message to the PDN GW, carrying a downlink data switch indication.

In this step, the SGW receives the bearer update message and if it detects that the resources it reserves are inconsistent with those reserved by the PDN GW, the SGW carries information of new resources it reserves in the bearer update message; inconsistency may happen in step 902 where the SGW reserves only the default bearer resource.

Upon reception of the message, the PDN GW determines that the setup of default and dedicated bearers of the E-UTRAN is complete. If the parameter carried in step 902 is "downlink path switch", the PDN GW switches the user plane downlink data path to the E-UTRAN and maintains the user plane uplink data path in the HRPD network.

Step 909: The PDN GW sends a bearer update response to the SGW.

Step 910: The SGW sends a bearer setup complete notification to the MME, indicating the MME that the bearer setup is complete via an indication parameter or a special message. The indication parameter is an indication parameter carried in the bearer setup complete notification message; the special message is the bearer setup complete notification message.

After the UE is successfully connected to the target network, the SGW uses a special message or indication parameter to indicate the PDN GW to switch the uplink path maintained in the source network. After this step, both the user plane uplink and downlink data paths with respect to the UE are switched to the target network.

Figure 10:
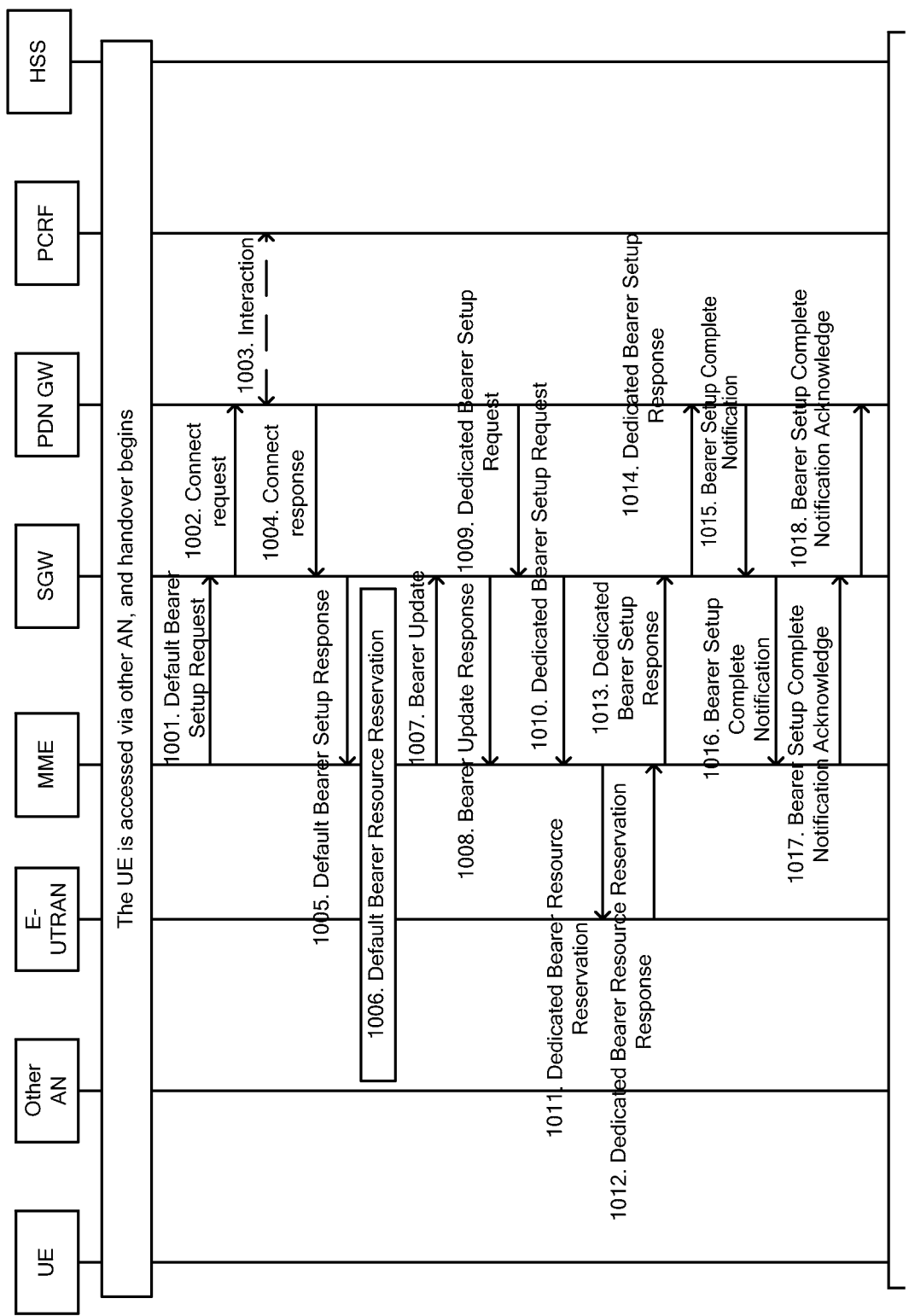
FIG. 10 is a flowchart in the third embodiment of the invention where bearers are set up one by one while the interaction between SGW and PDN GW is based on GTP.

FIG. 10 is a flowchart in the third embodiment of the invention where bearers are set up one by one while the interaction between SGW and PDN GW is based on GTP. As shown in FIG. 10, the process includes:

Step 1001: The MME sends a bearer setup message to the SGW, carrying an indication notifying the SGW that a connection setup process of handover is ongoing.

Step 1002: The SGW receives the default bearer setup message, reserves the resource and sends a connect request to the PDN GW.

In this step, if the SGW obtains QoS information of all requested bearers from the received bearer setup message, the SGW reserves resources for all bearers or else the SGW reserves the default bearer resource; the connect request sent by the SGW to the PDN GW may be a special message or carry a special parameter; the message carries a "path not switch" indication or "downlink path switch" indication. If the indication carried in the message is "path not switch", the PDN GW does not switch user plane uplink and downlink data paths upon reception of the indication but only proceeds to set up bearers; if the indication carried in the message is "downlink path switch", upon reception of the indication, the PDN GW determines that the setup of default and dedicated bearers is not complete in the current E-UTRAN and proceeds to set up bearers.

Step 1003: The PDN GW interacts with the PCRF to obtain PCC rules of all bearers.

Step 1004: The PDN GW reserves resources for all bearers and sends a connect response to the SGW, carrying information of the established default bearer.

Step 1005: The SGW receives the connect response message and sends a default bearer setup response to the MME.

Step 1006: The MME sets up the default bearer with the E-UTRAN.

Step 1007: The MME sends a bearer update message to the SGW, carrying information of the default bearer established by the E-UTRAN.

Step 1008: The SGW returns a bearer update response message to the MME.

Step 1009: The PDN GW sends a dedicated bearer setup message to the SGW.

In this step, if it is necessary to set up multiple dedicated bearers, the PDN GW may set up dedicated bearers in parallel or in series.

Step 1010: The SGW reserves dedicated bearer resources and sends a dedicated bearer setup request to the MME, carrying information of the established dedicated bearer.

Step 1011: The MME sets up dedicated bearers with the E-UTRAN and indicates the E-UTRAN not to establish an air interface connection.

In this step, the E-UTRAN reserves resources for dedicated bearers and sets up dedicated bearers with the MME. The MME indicates the E-UTRAN not to establish an air interface connection via a message or indication parameter. The message may be a resource reservation message and the indication parameter may be an indication parameter carried in the resource reservation message.

Step 1012: The E-UTRAN sends a dedicated bearer resource reservation response to the MME.

Step 1013: The MME sends a dedicated bearer setup response to the SGW, carrying information of the dedicated bearer established by the E-UTRAN.

Step 1014: The SGW sends a dedicated bearer setup response to the PDN GW, carrying information of the dedicated bearer established by the SGW.

In this step, upon reception of the message, the PDN GW determines that the setup of default and dedicated bearers of the E-UTRAN is complete. If the parameter carried in step 1102 is "downlink path switch", the PDN GW switches the user plane downlink data path to the E-UTRAN and maintains the user plane uplink data path in the HRPD network.

Step 1015: The PDN GW notifies the SGW that the setup of all bearers is complete.

In this step, if the PDN GW determines that the last bearer is established, the PDN GW notifies the SGW that the setup of all bearers is complete via a message or indication parameter.

Step 1016: The SGW sends a bearer setup complete notification to the MME and uses a special message or indication parameter to notify the MME that the setup of all bearers is complete. The indication parameter is an indication parameter carried in the bearer setup complete notification. The special message is the bearer setup complete notification. Afterwards, the MME can initiate subsequent operations related to completion of setup of all bearers.

Step 1017: The MME sends a bearer setup complete notification acknowledge to the SGW.

Step 1018: The SGW sends a bearer setup complete notification acknowledge to the PDN GW.

After the UE is successfully connected to the target network, the SGW uses a special message or indication parameter to indicate the PDN GW to switch the uplink data path maintained in the source network.

Fourth Embodiment

This embodiment describes the assurance of lossless uplink and downlink data on the user plane and continuity of services.

Solution 1: The SGW sends a message carrying the path not switch indication to the PDN GW, indicating the PDN GW not to switch the user plane but only to set up the default and/or dedicated bearers.

After the UE is connected to the target network, the SGW indicates the PDN GW again to switch user plane uplink and downlink data paths from the source network to the target network.

Solution 2: The SGW sends a message carrying a downlink path switch indication to the PDN GW, indicating the PDN GW to switch the downlink data path to the target network when determining the setup of all bearers is complete but maintain the uplink data path in the source network; when the UE is connected to the target network, the MME or SGW sends a message or indication parameter to the PDN GW, indicating the PDN GW to switch the uplink data path to the target network. Early path switch indications may be generated and transmitted by the MME and forwarded by the SGW, or be generated by the SGW according to the current status and transmitted directly by the SGW.

Figure 11:
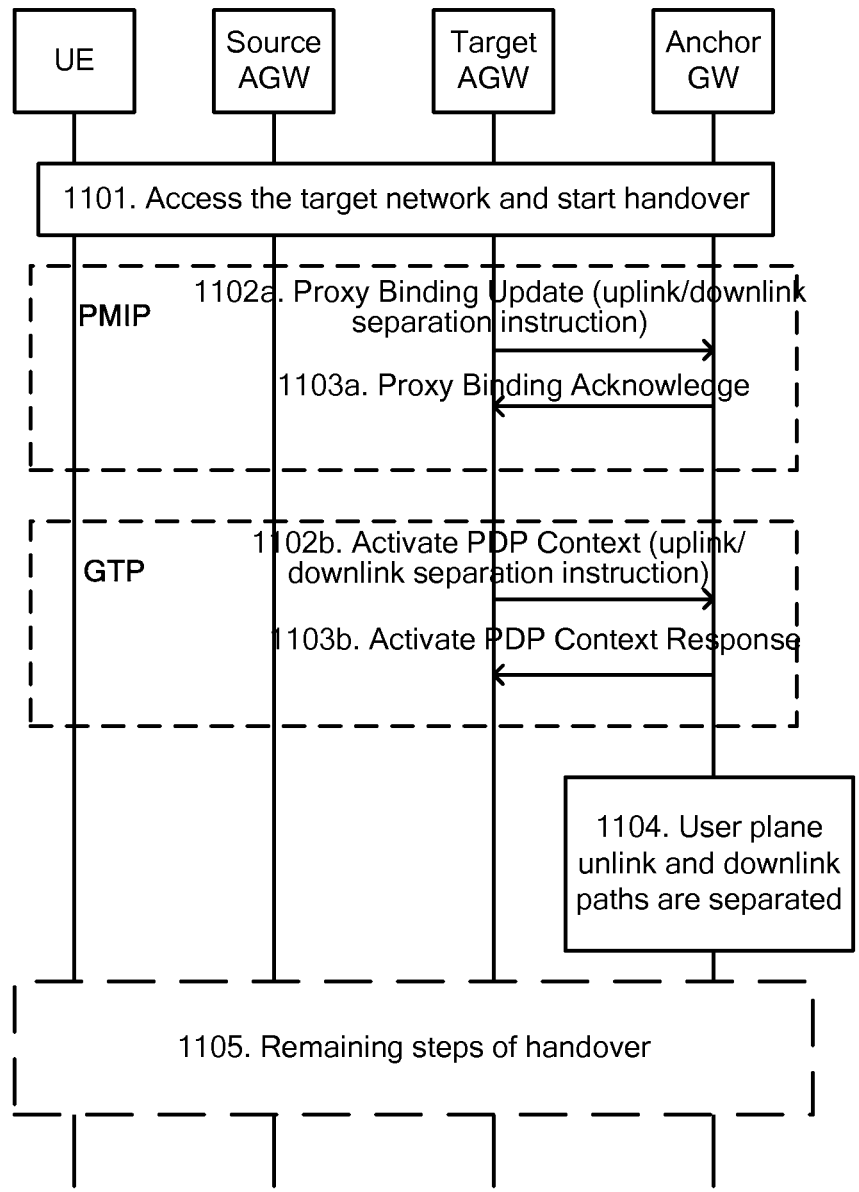
FIG. 11 is a flowchart in a fourth embodiment of the invention where a target access gateway indicates an anchor gateway to process user plane uplink and downlink data paths respectively on two user planes.

FIG. 11 is a flowchart in the fourth embodiment of the invention where a target access gateway indicates an anchor gateway to process user plane uplink and downlink data paths respectively on two user planes. In this embodiment, the uplink data path in the source network is maintained and the downlink data path is switched to the target network at the beginning of handover. As shown in FIG. 11, the process includes:

Step 1101: The UE accesses the target network and handover begins.

In this step, when handover begins, it is necessary to set up data paths between the target access gateway (target AGW) and the anchor GW. If communications between the target AGW and the anchor GW are based on PMIP, the process proceeds to steps 1102*a* and 1103*a*; if communications between the target AGW and the anchor GW are based on GTP, the process goes to 1102*b* and 1103*b*.

Step 1102*a*: After the target AGW completes the setup of all bearers in the target network, the target AGW sends a PBU message to the anchor GW.

In this step, the PBU message sent by the target GW carries an uplink and downlink separation indication. The indication information may be implemented by extending a flag bit E in the PBU message, with the value 1 indicating the necessity to separate uplink and downlink paths and the value 0 indicating no necessity to separate uplink and downlink paths.

FIG. 12 is a schematic drawing showing setting of the indication information in the embodiment of the invention. In FIG. 12, the flag bit E is set to indicate whether it is necessary to separate uplink and downlink paths.

Step 1103*a*: The anchor GW sends a PBA message to the target AGW.

Step 1102*b*: Before the target network completes the setup of all bearers, the target AGW sends an Activate PDP Context message to the anchor GW, carrying an uplink and downlink separation indication.

Step 1103*b*: The anchor GW sends an Activate PDP Context Response message to the target AGW.

Step 1104: The anchor GW separates the user plane uplink and downlink data paths.

In this step, the anchor GW maintains the user plane uplink data path in the source network and switches the user plane downlink data path from the source network to the target network.

Step 1105: The remaining steps of handover are completed.

In this step, remaining handover steps include: after the UE is handed over to the target network, the target AGW sends a normal PBU or Update PDP Context message, or a PBU or Update PDP Context message that carries an extended indication parameter to the anchor GW, indicating the anchor GW to switch the user plane uplink data path maintained in the source network to the target network, so that both user plane uplink and downlink paths of the UE are switched to the target network.

Figure 13:
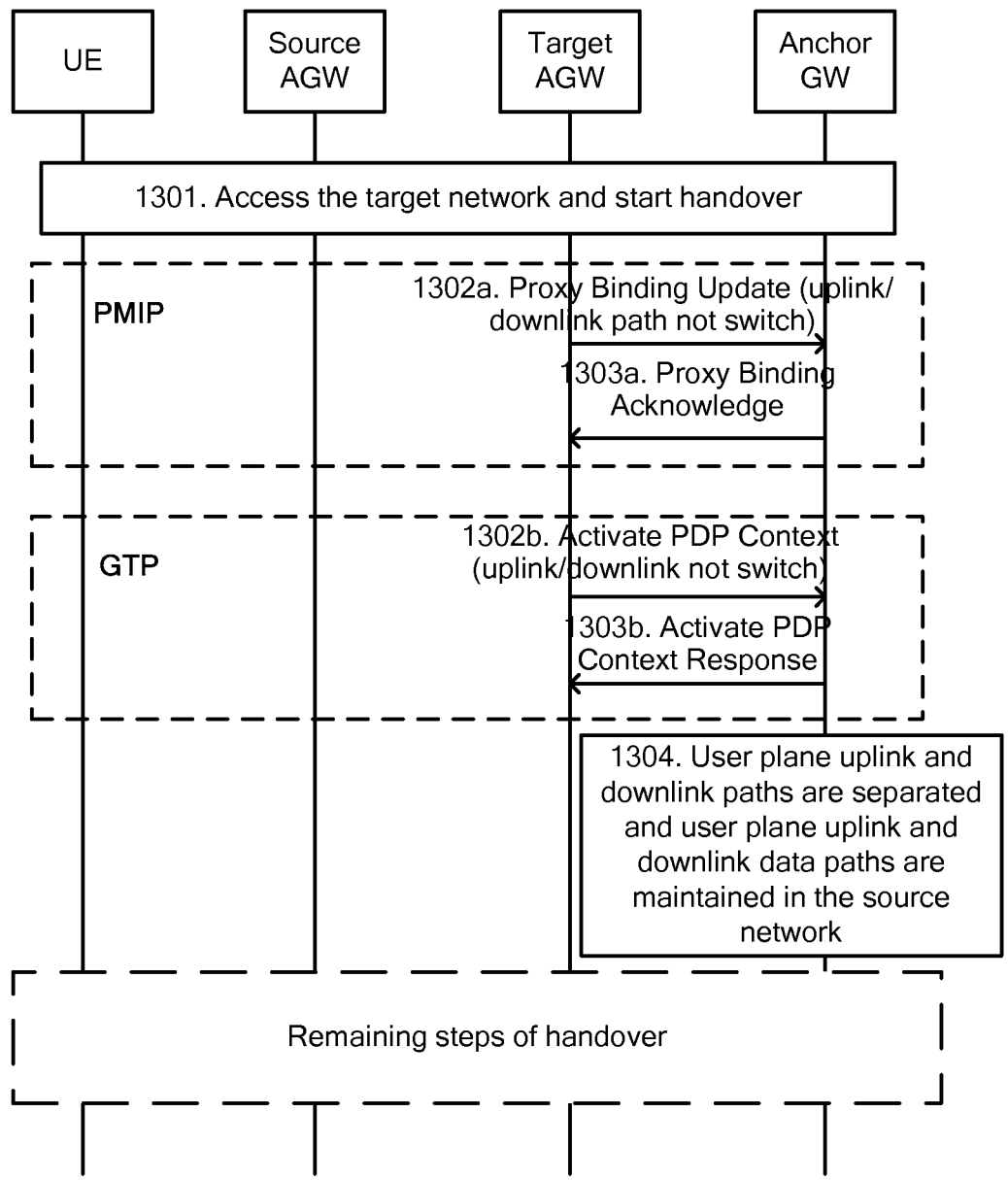
FIG. 13 is a flowchart in the fourth embodiment of the invention where a target access gateway indicates an anchor gateway not to switch user plane uplink and downlink data paths to a target network.

FIG. 13 is a flowchart in the fourth embodiment of the invention where a target access gateway indicates an anchor gateway not to switch user plane uplink and downlink data paths. In this embodiment, the user plane uplink and downlink data paths are maintained in the source network. As shown in FIG. 13, the process includes:

Step 1301: The UE accesses the target network and handover begins.

In this step, when handover begins, it is necessary to set up data paths between the target access gateway (target AGW) and the anchor GW. If communications between the target AGW and the anchor GW are based on PMIP, the process proceeds to steps 1302*a* and 1303*a*; if communications between the target AGW and the anchor GW are based on GTP, the process goes to steps 1102*b* and 1103*b*.

Step 1302*a*: After the target AGW completes the setup of all bearers in the target network, the target AGW sends a PBU message to the anchor GW.

In this step, the PBU message sent by the target GW carries an indication not to switch either the user plane uplink data path or the user plane downlink data path. The indication information may be implemented by extending a flag bit N in the PBU message, with the value 1 indicating not to switch either the user plane uplink data path or the user plane downlink data path.

Figure 14:
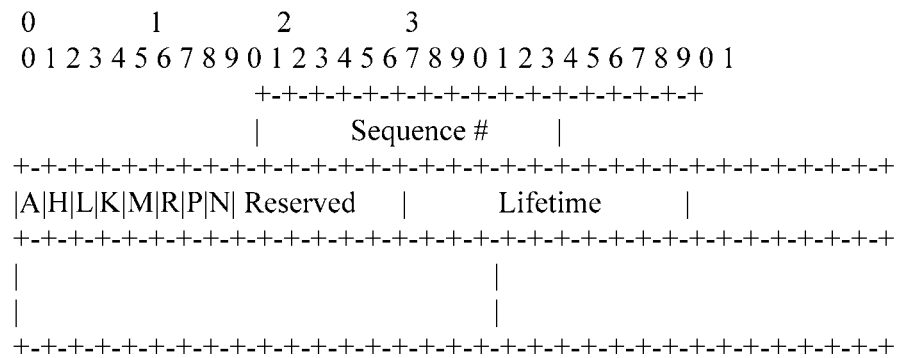
FIG. 14 is another schematic drawing showing setting of the indication information in an embodiment of the invention.

FIG. 14 is another schematic drawing showing setting of the indication information in the embodiment of the invention. In FIG. 14, when set to 1, the flag bit N indicates not to switch either the user plane uplink data path or the user plane downlink data path.

Step 1303*a*: The anchor GW sends a PBA message to the target AGW.

Step 1302*b*: Before the target network completes the setup of all bearers, the target AGW sends an Activate PDP Context message to the anchor GW, carrying an indication not to switch either the uplink or downlink data path.

Step 1303*b*: The anchor GW sends an Activate PDP Context Response message to the target AGW.

Step 1304: The anchor GW separates the user plane uplink and downlink paths and maintains the user plane uplink and downlink data paths in the source network.

In practice, when the handover is complete, it is necessary to cancel the processing of separating user plane uplink and downlink data paths. In the case of PMIP, it is only necessary to send a normal PBU message to reset the flag bit; in the case of GTP, an Update PDP Context message is required.

Fifth Embodiment

In this embodiment, the following technical solution is provided with respect to the PCC control (such as charging control) during a handover process:

1. An anchor GW interacts with a PCRF to obtain a PCC rule applicable to the target network. Two sets of PCC rules are available on the anchor GW.

2. The anchor GW enforces the two sets of PCC rules simultaneously, initiates bearer setup to the source network and controls the source network and the target network respectively, for example, enforcing charging control on the source network and target network simultaneously.

3. When the UE is connected to the target network, the anchor GW deletes the PCC rule applicable to the source network and then the anchor GW enforces the PCC rule applicable to the target network.

Figure 15:
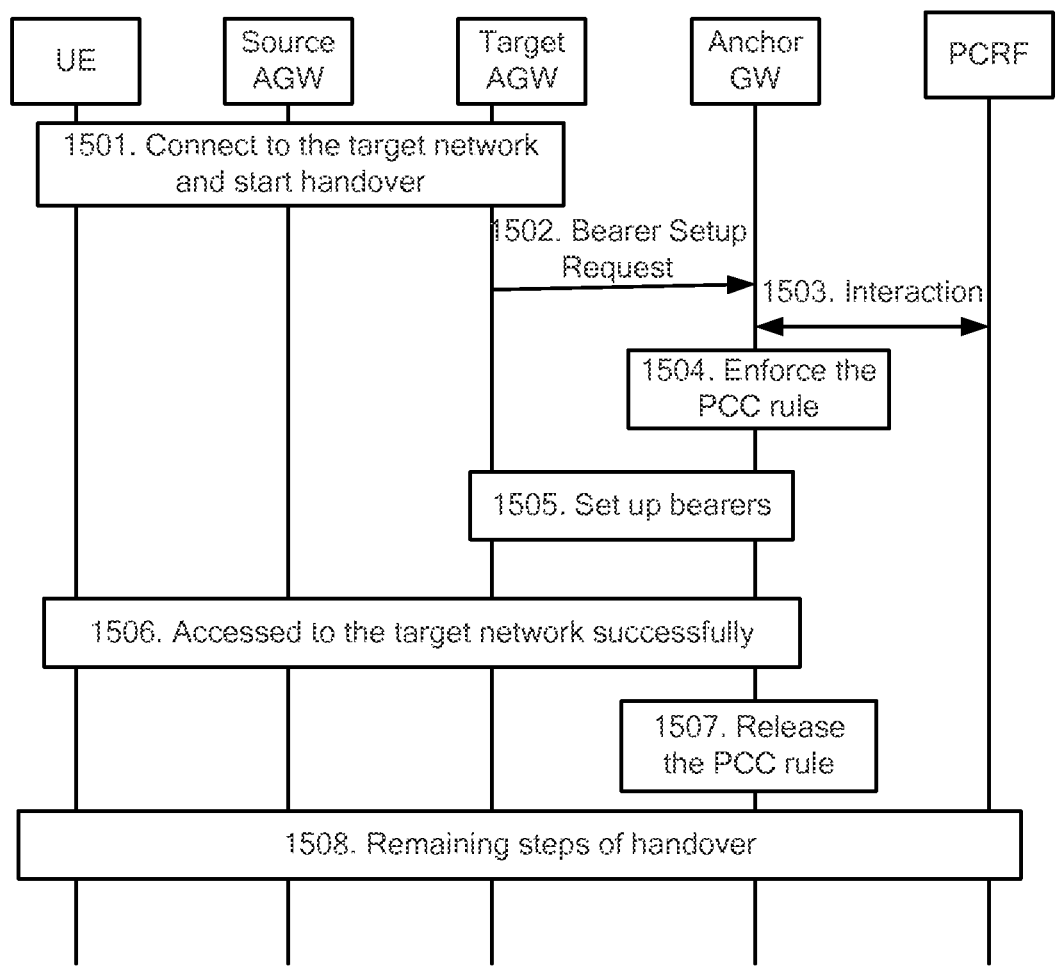
FIG. 15 is a flowchart in a fifth embodiment of the invention where a PCEF on an anchor GW controls PCC rules of the source/target network during a handover process.

FIG. 15 is a flowchart in the fifth embodiment of the invention where the PCEF on an anchor GW controls the PCC rule of the source/target network during a handover process. In this embodiment, a connection between the SGW and the PDN GW is established before bearer setup. As shown in FIG. 15, the process includes:

Step 1501: A UE establishes a connection with the target network and the handover begins.

In this step, a data path is not yet established between the target GW and the anchor GW and the anchor GW may be a PDN GW.

Step 1502: The target AGW sends a bearer setup message to the anchor GW.

Step 1503: The anchor GW interacts with the PCRF.

In this step, the anchor GW initiates an IP-CAN Modification process with the PCRF to obtain PCC rules applicable to the default and dedicated bearers and the message carries IP-CAN Type information.

Step 1504: The PCEF on the anchor GW receives the PCC rule applicable to the target network and initiates setup of the target network bearer, and enforces applicable PCC rules with respect to the source network and the target network respectively.

Step 1505: The anchor GW initiates setup of default and dedicated bearers with the target AGW according to the obtained PCC rule.

Step 1506: The UE is successfully connected to the target network.

Step 1507: The PCEF of the anchor GW deletes the PCC rule applicable to the source network.

In this step, after the UE is connected to the target network, the PCEF of the anchor GW deletes the PCC rule applicable to the source network and enforces only the PCC rule applicable to the target network.

Step 1508: The remaining steps of handover are completed.

Figure 16:
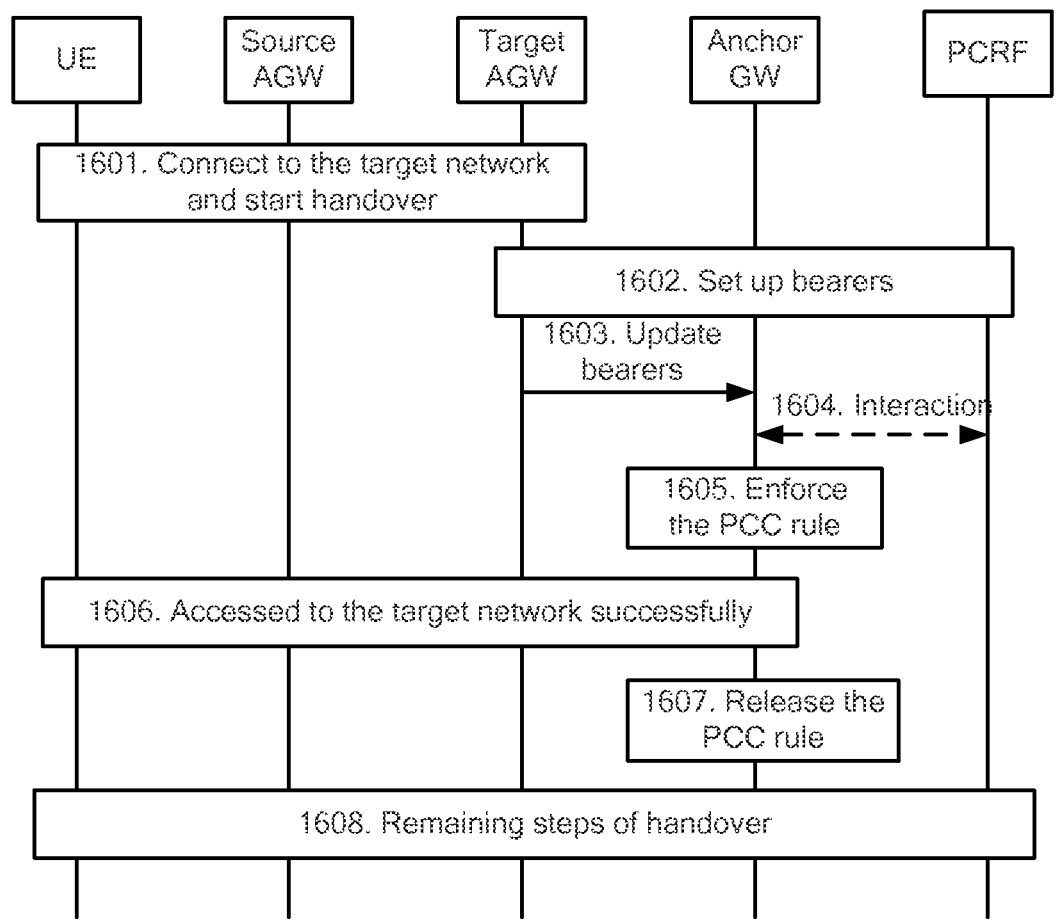
FIG. 16 is another flowchart in the fifth embodiment of the invention where the PCEF on an anchor GW controls PCC rules of the source/target network during a handover process.

FIG. 16 is another flowchart in the fifth embodiment of the invention where the PCEF on an anchor GW controls the PCC rules of the source/target network during a handover process. In this embodiment, a connection between the SGE and the PDN GW is established after bearer setup. As shown in FIG. 16, the process includes:

Step 1601: A UE establishes a connection with the target network and handover begins.

In this step, a data path is not yet established between the target GW and the anchor GW and the anchor GW may be a PDN GW.

Step 1602: The target AGW sets up default and dedicated bearers with the anchor GW.

Step 1603: The target AGW sends a bearer update message to the anchor GW.

In this step, after the target AGW completes the setup of default and dedicated bearers, the target AGW sends a bearer update message to the anchor GW, requesting setup of a connection.

Step 1604: The PCEF on the anchor GW interacts with the PCRF to obtain a PCC rule applicable to the target network.

Step 1605: The PCEF on the anchor GW enforces PCC rules.

In this step, the PCEF on the anchor GW obtains the PCC rule applicable to the target network and enforces applicable PCC rules with respect to the source network and the target network respectively. For example, the PCEF performs charging using respective charging rules. This means two sets of PCC rules are available on the anchor node of the network.

Step 1606: The UE is successfully connected to the target network.

Step 1607: The PCEF of the anchor GW deletes the PCC rule applicable to the source network.

In this step, after the UE is connected to the target network, the PCEF of the anchor GW deletes the PCC rule applicable to the source network and enforces only the PCC rule applicable to the target network.

Step 1608: The remaining steps of handover are completed.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile memory medium (for example, a CD-ROM, a USB disk, and a mobile hard disk), and includes several indications that indicate a computer device (a personal computer, a server, or a network device) to execute the methods provided in each embodiment of the present invention.

Although the present invention has been described through several exemplary embodiments, the invention is not limited to such embodiments. Moreover, the sequence by which the embodiments of the invention are described in this document is not indicative of any preference associated with any particular embodiment. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for implementing optimized handover, comprising:

indicating a Packet Data Network Gateway (PDN GW), by an mobility management entity (MME) or a serving gateway (SGW), not to switch at least one of a user plane uplink data path and a user plane downlink data path from a source network to a target network when a connection between the SGW and the PDN GW is being set up, after a connection establishing process to the target network via the source network is initiated by a user equipment (UE) when handover preparation is determined in the source network; and when, the UE is connected to the target network after completion of handover preparation, indicating the PDN GW, by the MME or the SGW, to switch the at least one of the user plane uplink data path and the user plane downlink data path from the source network to the target network;

wherein the indicating the PDN GW, by the MME or the SGW, not to switch the at least one of the user plane uplink data path and the user plane downlink data path from the source network to the target network comprises:

sending an indication to the SGW, from the MME wherein the indication is forwarded by the SGW to the PDN GW to instruct the PDN GW not to switch the at least one of the user plane uplink data path and the user plane downlink data path from the source network to the target network; or regenerating, by the SGW, an indication, and sending the indication to the PDN GW, to indicate the PDN GW not to switch the at least one of the user plane uplink data path and the user plane downlink data path from the source network to the target network.

2. The method of claim 1, wherein the when the connection between the SGW and the PDN GW is being set up comprises:

initiating a setting up connection to the PDN GW after the SGW completes the setup of a default and/or dedicated bearer to the access node (AN) of the target network; or initiating a setting up connection to the PDN GW before the SGW completes the setup of a default and/or dedicated bearer to the AN of the target network.

3. A method for implementing optimized handover, comprising:

indicating a Packet Data Network Gateway (PDN GW), by an mobility management entity (MME) or a serving gateway(SGW), not to switch at least one of a user plane uplink data path and a user plane downlink data path from a source network to a target network when a connection between the SGW and the PDN GW is being set up, after a connection establishing process to the target network via the source network is initiated by a user equipment (UE) when handover preparation is determined in the source network; and when the UE is connected to the target network after completion of handover preparation, indicating the PDN GW, by the MME or the SGW, to switch the at least one of the user plane uplink data path and the user plane downlink data path from the source network to the target network;

wherein the indicating the PDN GW, by the MME or the SGW, to switch the at least one of the user plane uplink data path and the user plane downlink data path from the source network to the target network comprises:

sending, by the MME, an indication to the SGW, wherein the indication is forwarded by the SGW to the PDN GW to instruct the PDN GW not to switch the at least one of the user plane uplink data path and the user plane downlink data path from the source network to the target network; or regenerating, by the SGW, an new indication, and sending the indication to the PDN GW to indicate the PDN GW to switch the at least one of the user plane uplink data path and the user plane downlink data path from the source network to the target network.

4. A method for implementing optimized handover from a source network to a target network, comprising:

transmitting, by a mobility management entity (MME) of the target network, a first indication to a serving gateway (SGW) of the target network, wherein the first indication is forwarded by the SGW to a packet data network gateway (PDN GW) of the target network to instruct the PDN GW not to switch at least one of a user plane uplink data path and a user plane downlink data path from the source network to the target network before a user equipment (UE) is connected to the target network;

determining, by the MME, that the UE is connected to the target network; and transmitting, by the MME, a second indication to the SGW, wherein the second indication is forwarded by the SGW to the PDN GW to instruct the PDN GW to switch the at least one of a user plane uplink data path and a user plane downlink data path from the source network to the target network;

wherein the first indication is comprised in a connection setup message or a connection updated message sent by the SGW to the PDN GW.

5. A method for implementing optimized handover, comprising:

initiating, by a user equipment (UE), a connection establishing process to a target network via a source network when determining to prepare for a handover in the source network;

initiating, by a packet data network gateway (PDN GW), a interacting with a Policy and Charging Rules Function (PCRF) after receiving a bearer connection request, and obtaining, by the PDN GW, a Policy and Charging Control (PCC) rule corresponding to the target network;

performing simultaneous, by the PDN GW, two sets of PCC rules corresponding to the source network and the target network, and initiating, by the PDN GW, a bearer setup process to the target network; and deleting, by the PDN GW, the PCC rule corresponding to the source network when the UE is connected to the target network after completion of handover preparation.

6. A system for implementing optimized handover, comprising:

a source network,
a mobility management entity (MME),
a serving gateway (SGW),
a packet data network gateway (PDN GW), and
an evolved UMTS Terrestrial Radio Access Network (E-UTRAN), wherein:

the source network is configured to receive a connecting request from a user equipment (UE) and send the connecting request to the MME;

the MME is configured to receive the connecting request from the source network, set up a bearer to the SGW, receive a bearer setup request from the SGW, send a resource reservation request to the E-UTRAN and indicate the E-UTRAN not to establish an air interface connection; receive a response message from the E-UTRAN and send a response message to the SGW; and receive a bearer setup complete notification from the SGW and complete the bearer setup;

the SGW is configured to establish a connection with the MME and send a proxy binding update message to the PDN GW according to the received response; and receive a bearer setup complete notification from the PDN GW or generated by itself and send the notification to the MME;

the PDN GW is configured to receive the proxy binding update message from the SGW and establish a user plane path with the SGW; and send a bearer setup complete notification to the SGW; and the E-UTRAN is configured to receive the resource reservation message, reserve resource and set up a bearer.

7. A system for implementing optimized handover, comprising:

a source network, a mobility management entity (MME), a serving gateway (SGW), and a packet data network gateway (PDN GW), wherein:

the source network is configured to receive a connecting request from a user equipment (UE) and send the connecting request to the MME;

the MME is configured to receive the connecting request from the source network, set up a bearers to the SGW, and when a connection is established or updated between the SGW and the PDN GW, indicate the PDN GW not to switch a user plane uplink data path and a user plane downlink data path from the source network to the target network; and, after the UE is connected to the target network, indicate the PDN GW to switch the user plane uplink data path and the user plane downlink data path from the source network to the target network;

the SGW is configured to establish a connection with the MME, establish or update the connection with the PDN GW, and send the received or self-generated user plane uplink and downlink data path processing indication to the PDN GW; and, after the UE is connected to the target network, indicate the PDN GW to switch the user plane uplink data path and the user plane downlink data path from the source network to the target network; and the PDN GW is configured to establish or update the connection with the SGW, receive the user plane uplink and downlink data path processing indication, and maintain the user plane uplink data path and the user plane downlink data path in the source network; and after the UE is connected to the target network, switch the user plane uplink data path and user plane downlink data path from the source network to the target network.

8. A system for implementing optimized inter-RAT handover, comprising: a source access gateway (source AGW), a target access gateway (target AGW), an anchor gateway (anchor GW), and a policy and charging rules function (PCRF), wherein the source AGW is configured to receive a connecting request from a user equipment (UE) and send the connecting request to the target AGW;

the target AGW is configured to receive the connecting request from the source AGW and send a bearer setup request to the anchor GW;

the anchor GW is configured to receive the bearer setup request, interact with the PCRF to obtain a policy and charging control (PCC) rule corresponding to the target network, and after handover preparation is complete and the UE is connected to the target network, delete a PCC rule applicable to the source network; and the PCRF is configured to interact with the anchor GW to deliver the PCC rule.

9. An apparatus for implementing optimized handover from a source network to a target network, comprising:

a transmitter, configured to transmit a first indication to a serving gateway (SGW) of the target network, wherein the first indication is forwarded by the SGW to a packet data network gateway (PDN GW) of the target network to instruct the PDN GW not to switch at least one of a user plane uplink data path and a user plane downlink data path from the source network to the target network before a user equipment (UE) is connected to the target network;

a processor, configured to determine that the UE is connected to the target network; and the transmitter, configured to transmit a second indication to the SGW, wherein the second indication is forwarded by the SGW to the PDN GW to instruct the PDN GW to switch the at least one of a user plane uplink data path and a user plane downlink data path from the source network to the target network;

wherein the first indication is comprised in a connection setup message or a connection updated message sent by the SGW to the PDN GW.

10. An apparatus for implementing optimized handover from a source network to a target network, comprising:

a transmitter, configured to transmit a first indication to a serving gateway (SGW) of the target network, wherein the first indication is forwarded by the SGW to a packet data network gateway (PDN GW) of the target network to instruct the PDN GW not to switch at least one of a user plane uplink data path and a user plane downlink data path from the source network to the target network, after a connection establishing process to the target network via the source network is initiated by a user equipment (UE) when handover preparation is determined in the source network;

a processor, configured to determine that the UE is connected to the target network after completion of handover preparation; and the transmitter, configured to transmit a second indication to the SGW, wherein the second indication is forwarded by the SGW to the PDN GW to instruct the PDN GW to switch the at least one of a user plane uplink data path and a user plane downlink data path from the source network to the target network.

* * * * *